US011508969B2

(12) United States Patent
Brewer et al.

(10) Patent No.: US 11,508,969 B2
(45) Date of Patent: Nov. 22, 2022

(54) STRUCTURED ANODES FOR LITHIUM-BASED ENERGY STORAGE DEVICES

(71) Applicant: Graphenix Development, Inc., Williamsville, NY (US)

(72) Inventors: John C. Brewer, Rochester, NY (US); Terrence R. O'Toole, Webster, NY (US)

(73) Assignee: Graphenix Development, Inc., Williamsville, NY (US)

( * ) Notice: Subject to any disclaimer, the term of this patent is extended or adjusted under 35 U.S.C. 154(b) by 244 days.

(21) Appl. No.: 16/997,105

(22) Filed: Aug. 19, 2020

(65) Prior Publication Data
US 2021/0057757 A1 Feb. 25, 2021

Related U.S. Application Data

(60) Provisional application No. 62/889,351, filed on Aug. 20, 2019.

(51) Int. Cl.
*H01M 4/70* (2006.01)
*H01M 4/62* (2006.01)
(Continued)

(52) U.S. Cl.
CPC .............. *H01M 4/70* (2013.01); *H01M 4/134* (2013.01); *H01M 4/625* (2013.01); *H01M 4/626* (2013.01);
(Continued)

(58) Field of Classification Search
CPC ........ H01M 4/70; H01M 4/134; H01M 4/625; H01M 2004/027; H01M 4/661;
(Continued)

(56) References Cited

U.S. PATENT DOCUMENTS 5,567,474 A 10/1996 Dover et al.
5,776,369 A 7/1998 Dover et al.
(Continued)

FOREIGN PATENT DOCUMENTS

WO WO2013012334 A1 1/2013
WO WO2015175509 A1 11/2015
(Continued)

OTHER PUBLICATIONS

Amine, et al.,"Novel Chemistry: Lithium Selenium and Selenium Sulfur Couple", Argonne Natl Lab, DOE Merit review, Jun. 6-10, 2016 Project ES280 https://www.energy.gov/sites/prod/files/2016/06/f32/es280_amine_2016_p_web.pdf, 22 pages.
(Continued)

*Primary Examiner* — Stewart A Fraser
(74) *Attorney, Agent, or Firm* — Kilpatrick Townsend & Stockton LLP

(57) ABSTRACT

An anode for an energy storage device includes a current collector. The current collector includes: i) an electrically conductive substrate including a first electrically conductive material; ii) a plurality of electrically conductive structures in electrical communication with the electrically conductive substrate, wherein each electrically conductive structure includes a second electrically conductive material; and iii) a metal oxide coating. The metal oxide coating includes one or both of: a) a first metal oxide material in contact with the electrically conductive substrate; or b) a second metal oxide material in contact with the electrically conductive structures; or both (a) and (b). The anode further includes lithium storage coating overlaying the metal oxide coating, the lithium storage layer including a total content of silicon, germanium, or a combination thereof, of at least 40 atomic %. The electrically conductive structures are at least partially embedded within the lithium storage coating.

20 Claims, 10 Drawing Sheets

(51) Int. Cl.
*H01M 4/134* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(58) Field of Classification Search
CPC ...... H01M 4/663; H01M 4/386; H01M 4/626; H01M 2004/021
See application file for complete search history.

(56) References Cited

U.S. PATENT DOCUMENTS

| | | | |
|---|---|---|---|
| 5,976,403 | A | 11/1999 | Dover et al. |
| 6,761,744 | B1 | 7/2004 | Tsukamoto et al. |
| 6,911,280 | B1 | 6/2005 | De Jonghe et al. |
| 7,378,041 | B2 | 5/2008 | Asao et al. |
| 7,767,341 | B2 | 8/2010 | Kogetsu et al. |
| 8,257,866 | B2 | 9/2012 | Loveness et al. |
| 8,377,236 | B2 | 2/2013 | Yakovleva et al. |
| 8,906,523 | B2 | 12/2014 | Brantner et al. |
| 9,257,704 | B2 | 2/2016 | Balu et al. |
| 9,281,515 | B2 | 3/2016 | Nazri et al. |
| 9,293,771 | B2 | 3/2016 | Tani et al. |
| 9,376,455 | B2 | 6/2016 | Lee et al. |
| 10,008,717 | B2 | 6/2018 | Suzuki et al. |
| 10,014,552 | B1 | 7/2018 | Shnitser et al. |
| 10,115,960 | B2 | 10/2018 | Lee et al. |
| 10,164,252 | B2 | 12/2018 | Yang et al. |
| 10,686,214 | B2 | 6/2020 | Liu et al. |
| 10,910,653 | B2 | 2/2021 | Brew et al. |
| 11,024,842 | B2 | 6/2021 | O'toole et al. |
| 2005/0031958 | A1 | 2/2005 | Fukuoka et al. |
| 2006/0216604 | A1 | 9/2006 | Kawase et al. |
| 2007/0207381 | A1 | 9/2007 | Ohtsuka et al. |
| 2010/0040951 | A1 | 2/2010 | Yamamoto et al. |
| 2010/0216026 | A1 | 8/2010 | Lopatin et al. |
| 2010/0285358 | A1 | 11/2010 | Cui et al. |
| 2010/0330421 | A1 | 12/2010 | Cui et al. |
| 2011/0111304 | A1 | 5/2011 | Cui et al. |
| 2011/0159365 | A1 | 6/2011 | Loveness et al. |
| 2011/0266654 | A1 | 11/2011 | Kuriki et al. |
| 2012/0121983 | A1 | 5/2012 | Yoon et al. |
| 2013/0143124 | A1 | 6/2013 | Lee et al. |
| 2014/0011088 | A1 | 1/2014 | Lopatin et al. |
| 2014/0248543 | A1 | 9/2014 | Zhu et al. |
| 2015/0072119 | A1 | 3/2015 | George et al. |
| 2015/0118572 | A1 | 4/2015 | Lund et al. |
| 2015/0325852 | A1* | 11/2015 | Wang ............... H01M 4/386 429/231.95 |
| 2016/0190564 | A1 | 6/2016 | Samarao et al. |
| 2017/0133662 | A1 | 5/2017 | Cui et al. |
| 2017/0279163 | A1 | 9/2017 | Jang et al. |
| 2017/0301616 | A1 | 10/2017 | Biederman et al. |
| 2017/0335482 | A1 | 11/2017 | Date et al. |
| 2017/0338464 | A1 | 11/2017 | Fasching et al. |
| 2018/0083264 | A1 | 3/2018 | Soppe |
| 2018/0123132 | A1 | 5/2018 | Kawakami et al. |
| 2018/0145367 | A1 | 5/2018 | Busacca et al. |
| 2018/0166735 | A1 | 6/2018 | Busacca et al. |
| 2018/0287130 | A1 | 10/2018 | de Souza et al. |
| 2019/0044151 | A1 | 2/2019 | Elam et al. |
| 2019/0097275 | A1 | 3/2019 | Mitlin et al. |
| 2019/0267361 | A1 | 8/2019 | Brewer et al. |
| 2020/0411851 | A1 | 12/2020 | O'Toole et al. |
| 2021/0050584 | A1 | 2/2021 | Brewer et al. |
| 2021/0057733 | A1 | 2/2021 | Brewer et al. |

FOREIGN PATENT DOCUMENTS

| | | |
|---|---|---|
| WO | WO2016112333 A1 | 7/2016 |
| WO | 2019165412 A1 | 8/2019 |
| WO | WO2020039609 A1 | 2/2020 |
| WO | 2021029769 A | 2/2021 |
| WO | 2021241130 A1 | 2/2021 |
| WO | WO2021241130 | 12/2021 |

OTHER PUBLICATIONS

Beattie, "Understanding capacity fade in silicon based electrodes for lithium-ion batteries using three electrode cells And upper cut-off voltage studies", Science Direct, Journal of Power Sources, 2016, vol. 302, 426-430, Elsevier.
Cho, "Enhanced Lithium Ion battery Cycling of Silicon Nanowire Anodes by Template Growth to Eliminate Silicon Underlayer Islands", NANO Letters, 2013. vol. 13, 5740-5747.
Christopherson; Jon P. "Battery Test Manual For Electric Vehicles", , Idaho National Lab, Jun. 2015, 67 pages.
Corte, "Effets du traitement chimique de la surface d'une", Ecole Polytechnique ParisTech, Oct. 2013, 1-139.
Domi, et al., "Effect of Mechanical Pre-Lithiation on Electrochemical Performance of Silicon Negative Electrode for Lithium-Ion Batteries", J. Electrochem. Soc. 164(7) pp. A1651-A1654, Jun. 2017.
Fotouhi, et al., "Lithium-Sulfur Battery Technology Readiness and Applications—A Review", Energies Nov. 2017, 15 pages.
Gomez-Baquero, "Silicon Anodes to Enable Better Lithium Ion Batteries", ResearchGate, Apr. 2016, 1-28, Besstect LLC.
Holstiege, et al., "Pre-Lithiation Strategies for Rechargeable Energy Storage Technologies: Concepts, Promises and Challenges", Batteries, Jan. 2018, 39 pages.
Kim, "Electrochemical characteristics of Si/Mo multilayer anode for Li ion batteries", Revista Mexicana De Fisica S53, 2007, 17-20.
Li, "One-step synthesis of Li-doped NiO as high-performance anode material for lithium ion batteries", Ceramics International, 2016, vol. 42, 14565-14572, Elsevier.
Lin, "Optical Characterization of Hydrogenated Amorphous Silicon Thin Films Deposited at High Rate", Journal of Electronic Materials, 1999, vol. 28, No. 12, 1452-1456.
Lin, et al., "Lithium Superionic Sulfide Cathode for All-Solid Lithium-Sulfur Batteries", ACS Nano, vol. 7, No. 3, 2829-2833 Feb. 2013.
Lin, et al., "Reviving the lithium metal anode for high-energy batteries", Nature Nanotechnology, vol. 12, 194-206, Mar. 2017.
Nominand, et al., "Process and Material Properties of PECVD Boron-Doped Amorphous Silicon Film", https://www.electrochem.org/dl/ma/201/pdfs/0399.pdf (pub date unknown), 1 page.
Notten, "Advanced Energy Storage Materials for Battery Applications, Advanced Materials", Dec. 12, 2012, 1-50, NL Agency Ministry of Economic Affairs, Agriculture and Innovation.
Quiroga-González, "Optimal Conditions for Fast Charging and Long Cycling Stability of Silicon Microwire Anodes for Lithium on Batteries, and Comparison with the Performance of Other Si Anode Concepts", Energies, 2013, vol. 6, 5145-5156.
Sakabe, et al., "Effect of Mechanical Pre-Lithiation on Electrochemical Performance of Silicon Negative Electrode for Lithium-Ion Batteries", J. Electrochem. Soc. 164(7) A1651-A1654 (2017).
Salah, Pure silicon thin-film anodes for lithium-ion batters: A review, Journal of Power Sources, 2019, vol. 414, 48-67, Elsevier.
Soppe, Self-Organized Nano-Structures Silicon as Anode Material for Li-Ion Batteries, Meeting of Materials Research Society, Apr. 2-6, 2018, 1 page, Phoenix, Arizona.
Stefan; Ionel, "A Commercially Scalable Process for Silicon Anode Prelithiation", Amprius Inc, DOE Merit Review, Jun. 6-10, 2016, Project ES250 https://www.energy.gov/sites/prod/files/2016/06/f32/es250_stefan_2016_o_web.pdf, 23 pages.
Sun, "Nanomembranes Based on Nickel Oxide and Germanium as Anode Materials for Lithium-Ion Batteries", Dissertation, May 10, 2017, China.
Uehara, "Thick vacuum deposited silicon films suitable for the anode of Li-ion battery", Journal of Power Sources, 2005 vol. 146, 441-444, Science Direct.
Ulvestad, et al., "Silicon Nitride Coated Silicon Thin Films as Anodes for Li-Ion Batteries:", ECS Transactions, 64 (22) 107-111, Apr. 2015.

(56) References Cited

OTHER PUBLICATIONS

Ulvestad, et al., "Silicon nitride as anode material for Li-ion batteries: Understanding the SiNx conversion reaction", J. Power Sources 399, Aug. 2018 414-421.
Valladares, et al., Characterization of Ni thin films following thermal oxidation in air, Journal of Science Technology, B, vol. 32, Sep./Oct. 2014.
Wu, et al., "Silicon nitride coated silicon thin film on three dimensions current collector for lithium ion battery anode", J. Power Sources 325, Jun. 2016, pp. 64-70.
Xu et al., "A high-performance Li-ion anode from direct deposition of Si nanoparticles", Nano Energy 38 (2017) 477-485.
Xu et al., "A high-performance Li-ion anode from direct deposition of Si nanoparticles", no publication date available.
Xu et al., "Engineering the Direct Deposition of Si Nanoparticles for Improved Performance in Li-Ion Batteries", Journal of the Electrochemical Society, 166 (3) A5252-A5258 (2019).
Yang; Jinho, "Development Of Silicon-Based Anodes And In-Situ Characterization Techniques For Lithium Ion Batteries", Jinho Yang Dissertation, Wayne State Univ , Jan. 2014, 125 pages.
Zhao, et al., "A general prelithiation approach for group IV elements and corresponding oxides", Energy Storage Materials Jun. 2017, 7 pages.
International Application No. PCT/US2020/046970 received an International Search Report and Written Opinion dated Nov. 9, 2020, 8 pages.
International Application No. PCT/US2021/026179 received an International Search Report and Written Opinion dated Jul. 9, 2021, 9 pages.

\* cited by examiner

STRUCTURED ANODES FOR
LITHIUM-BASED ENERGY STORAGE
DEVICES

CROSS REFERENCE TO RELATED APPLICATION

This application claims the benefit of priority of U.S. Provisional Application No. 62/889,351, filed Aug. 20, 2019, which is incorporated herein by reference in its entirety for all purposes.

TECHNICAL FIELD

The present disclosure relates to lithium ion batteries and related energy storage devices.

BACKGROUND

Silicon has been proposed as a potential material for lithium-ion batteries to replace the conventional carbon-based anodes which have a storage capacity that is limited to ~370 mAh/g. Silicon readily alloys with lithium and has a much higher theoretical storage capacity (~3600 to 4200 mAh/g at room temperature) than carbon-based anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles, and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into structured silicon approaches, such batteries based primarily on silicon have yet to make a large market impact due to unresolved problems.

SUMMARY

There remains a need for anodes for lithium-based energy storage devices such as Li-ion batteries that are easy to manufacture, robust to handling, high in charge capacity and amenable to fast charging, for example, at least 1C. These and other needs are addressed by the embodiments described herein.

In accordance with an embodiment of this disclosure, an anode for an energy storage device is provided that includes a current collector and a lithium storage coating. The current collector includes: i) an electrically conductive substrate including a first electrically conductive material; ii) a plurality of electrically conductive structures in electrical communication with the electrically conductive substrate, wherein each electrically conductive structure includes a second electrically conductive material; and iii) a metal oxide coating. The metal oxide coating includes one or both of: a) a first metal oxide material in contact with the electrically conductive substrate; or b) a second metal oxide material in contact with the electrically conductive structures; or both (a) and (b). The anode further includes lithium storage coating overlaying the metal oxide coating, the lithium storage layer including a total content of silicon, germanium, or a combination thereof, of at least 40 atomic %. The electrically conductive structures are at least partially embedded within the lithium storage coating.

The present disclosure provides anodes for energy storage devices that may have one or more of at least the following advantages relative to conventional anodes: improved stability at aggressive ≥1C charging rates; higher overall areal charge capacity; higher charge capacity per gram of silicon; improved physical durability; simplified manufacturing process; and more reproducible manufacturing process.

BRIEF DESCRIPTION OF DRAWINGS

FIGS. 3A-2C are cross-sectional views illustrating the making of an anode according to some embodiment of the present disclosure.

DETAILED DESCRIPTION

It is to be understood that the drawings are for purposes of illustrating the concepts of the disclosure and may not be to scale. Various aspects of anodes of the present disclosure, including metal oxide layers, deposition of lithium storage material, additional layers and methods are described in co-pending U.S. patent application Ser. Nos. 16/285,842, 16/909,008, 16/991,613, 16/991,623, and 16/991,626, the entire contents of which are incorporated by reference for all purposes.

Anode Overview

Figure 1A:
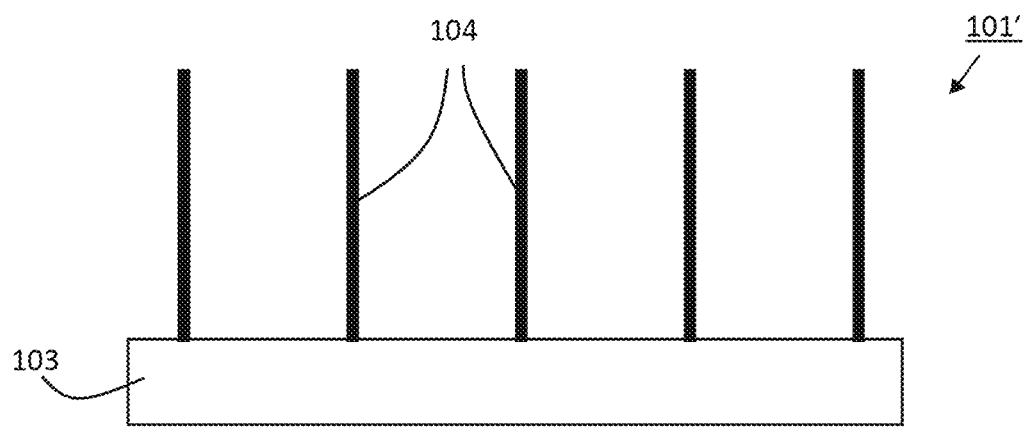
FIGS. 1A-1C are cross-sectional views illustrating the making of an anode according to some embodiment of the present disclosure.
Figure 1B:
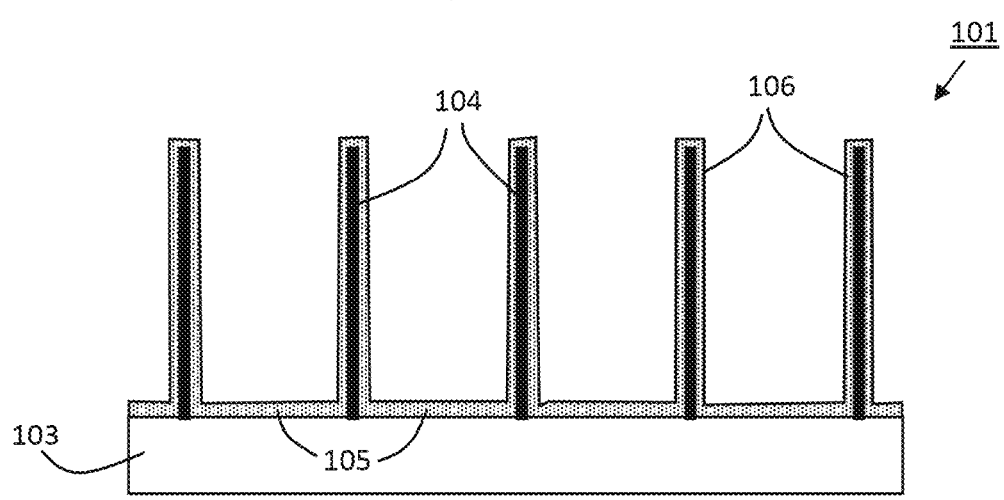
Figure 1C:
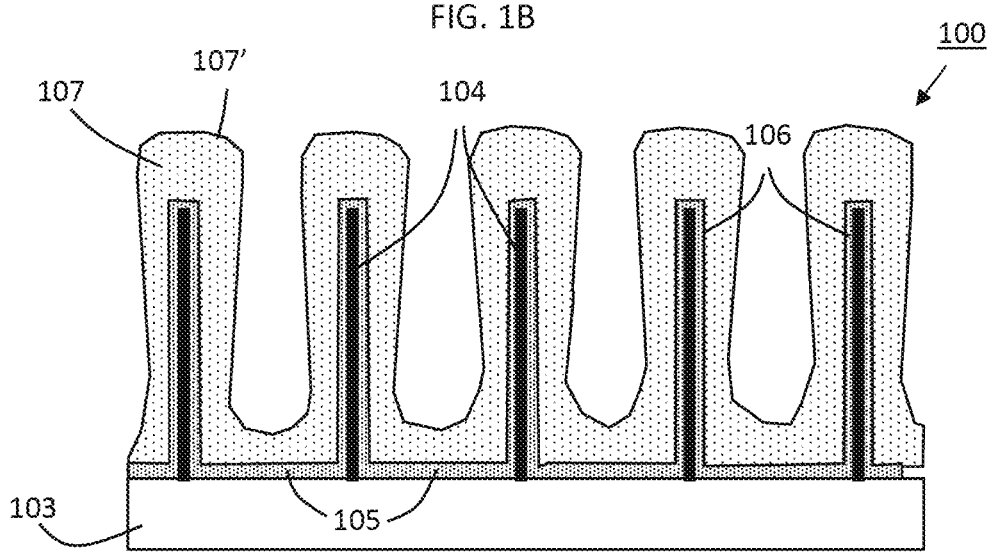

FIGS. 1A-1C are cross-sectional views illustrating the fabrication of an anode according to some embodiments of the present disclosure. In FIG. 1A, a current collector precursor 101' includes an electrically conductive substrate 103 and a plurality of electrically conductive structures 104 in electrical communication with the electrically conductive substrate 103, for example, through direct physical contact. The electrically conductive substrate 103 includes a first electrically conductive material and each of the plurality of electrically conductive structures comprises a second electrically conductive material, which may be the same as, or different than, the first electrically conductive material.

Materials, methods of making, and other features of the current collector precursor 101' are discussed later.

In FIG. 1B, a metal oxide coating is provided in contact with the current collector precursor 101' to form current collector 101. In the present embodiment, the metal oxide coating includes a first metal oxide material 105 formed in contact with the electrically conductive substrate 103 and a second metal oxide material 106 formed in contact with electrically conductive structures 104. In some embodiments, the first metal oxide material is provided as a coating or layer over most of the available surface area of the electrically conductive substrate not otherwise occupied by the electrically conductive structures. Materials, methods of forming, and other features of the metal oxide material are discussed later.

In FIG. 1C, a lithium storage coating 107 having an outer surface 107' is deposited over the current collector 101 and in contact with the metal oxide coating (the first metal oxide material 105 and second metal oxide material 106) to form anode 100. The electrically conductive structures 104 are at least partially embedded within the lithium storage coating 107. That is, the lithium storage coating includes a plurality of concavities with an electrically conductive structure present in each concavity. As shown in FIG. 1C, the electrically conductive structures 104 may be fully embedded within the lithium storage coating 107. In some embodiments, as discussed later, the lithium storage coating may include porous silicon deposited by a CVD process, for example, a PECVD process. In some embodiments, the thickness of the lithium storage coating may be characterized by the distance between the lithium storage coating outer surface 107' to the nearest metal oxide material. The thickness may vary along the structure.

Figure 2A:
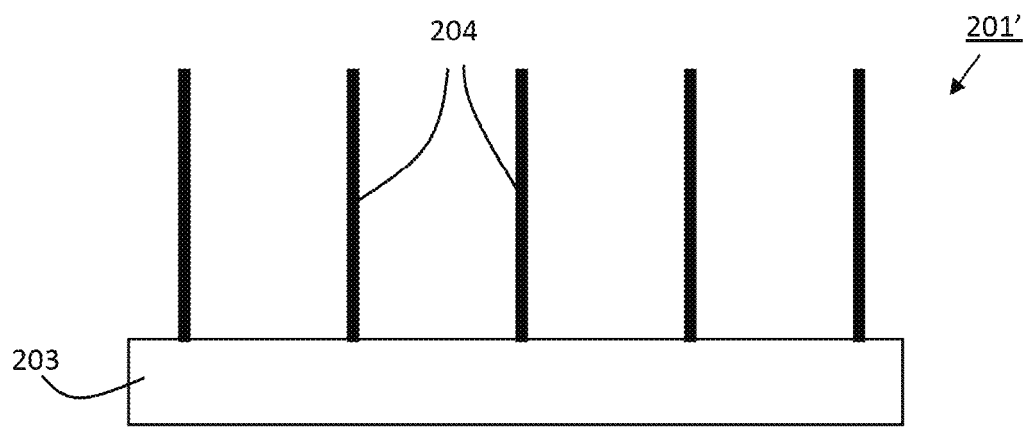
FIGS. 2A-2E are cross-sectional views illustrating the making of an anode according to some embodiment of the present disclosure.
Figure 2B:
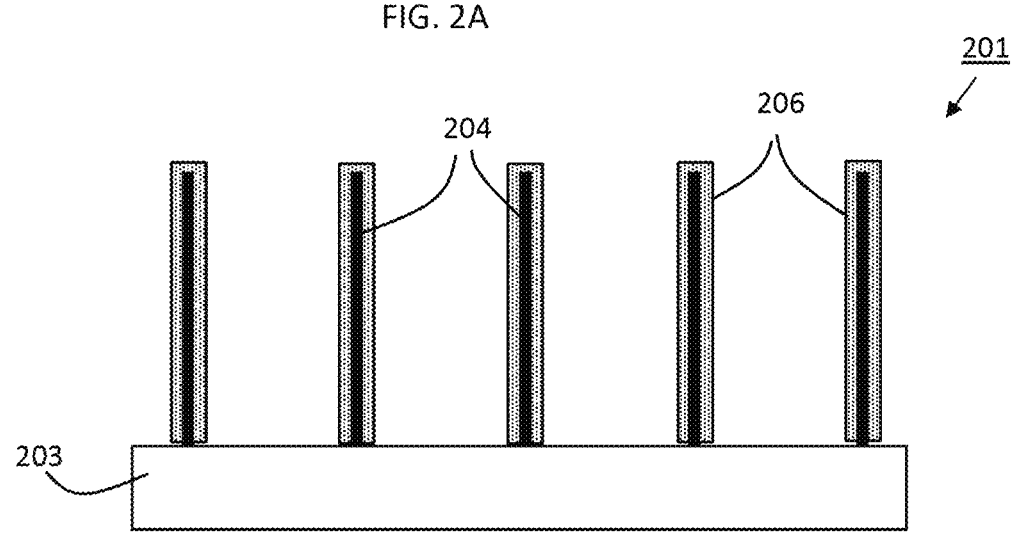
Figure 2C:
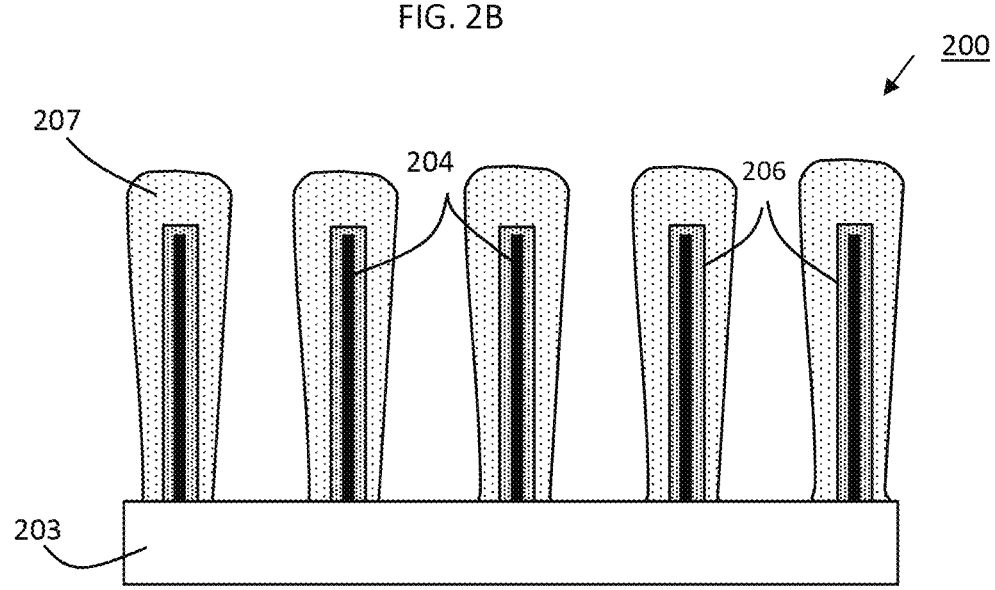

FIGS. 2A-2C are cross-sectional views illustrating the fabrication of an anode according to some embodiments of the present disclosure. In FIG. 2A, a current collector precursor 201' includes an electrically conductive substrate 203 and a plurality of electrically conductive structures 204 in electrical communication with the electrically conductive substrate 203, for example, through direct physical contact. The electrically conductive substrate 203 includes a first electrically conductive material and each of the plurality of electrically conductive structures comprises a second electrically conductive material, which may be the same as, or different than, the first electrically conductive material. Materials, methods of making, and other features of the current collector precursor 201' are discussed later.

In FIG. 2B, a metal oxide coating is provided in contact with the current collector precursor 201' to form current collector 201. In the present embodiment, the metal oxide coating includes a second metal oxide material 206 formed in contact with electrically conductive structures 204. Unlike FIG. 1, there is no substantial amount metal oxide (e.g., less than 0.01 μm thick if any at all) in contact with the electrically conductive substrate. Materials, methods of forming, and other features of the metal oxide material are discussed later.

In FIG. 2C, a lithium storage coating 207 may be deposited to form anode 200. The lithium storage coating 207 may overlay and be in contact with the second metal oxide material 206. The electrically conductive structures 204 may be at least partially embedded within the lithium storage coating 207. The electrically conductive structures 204 may be fully embedded within the lithium storage coating 207. In some embodiments, as discussed later, the lithium storage coating may include porous silicon deposited by a CVD process, for example, a PECVD process. In some embodiments, as shown in FIG. 2C, the lithium storage coating may selectively deposit on the second metal oxide material 206 and does not form an adherent coating over the electrically conductive substrate In some embodiments, the rate of CVD reaction may be faster at the second metal oxide material surface than at the electrically conductive substrate surface and may continue to be faster at the surface of the lithium storage coating than at the electrically conductive substrate.

Figure 2D:
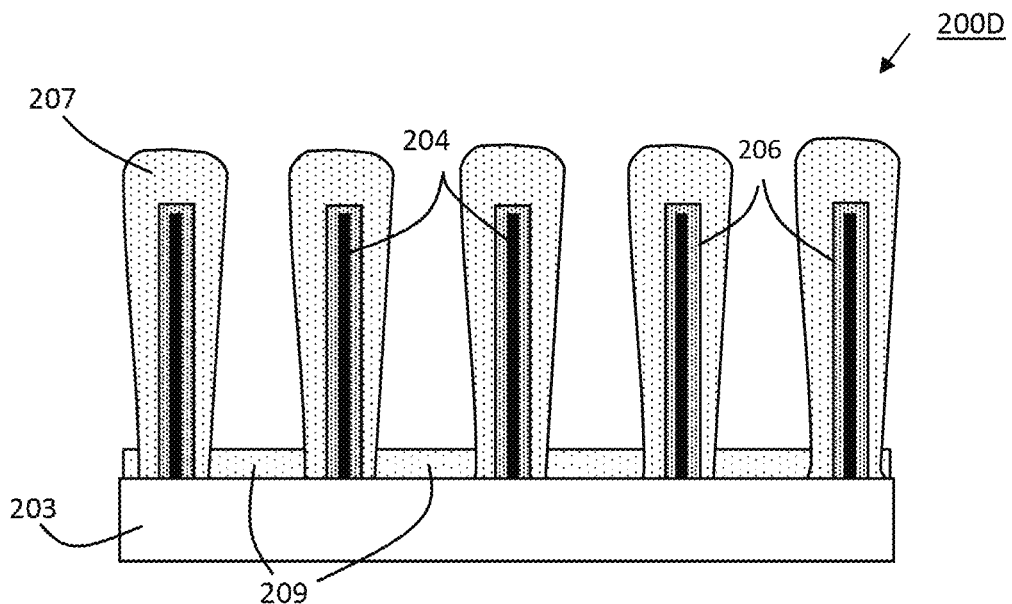

In some embodiments, as shown in FIG. 2D, anode 200D is formed where some lithium storage material may also deposit onto the bare electrically conductive substrate, for example, as a lithium storage layer 209, which may have a similar composition to lithium storage coating 207. In some embodiments, the electrically conductive structures and lithium storage coating 207 may physically assist in holding the lithium storage layer 209 between such structures in place to maintain adherence and electrical continuity with the electrically conductive substrate.

Figure 2E:
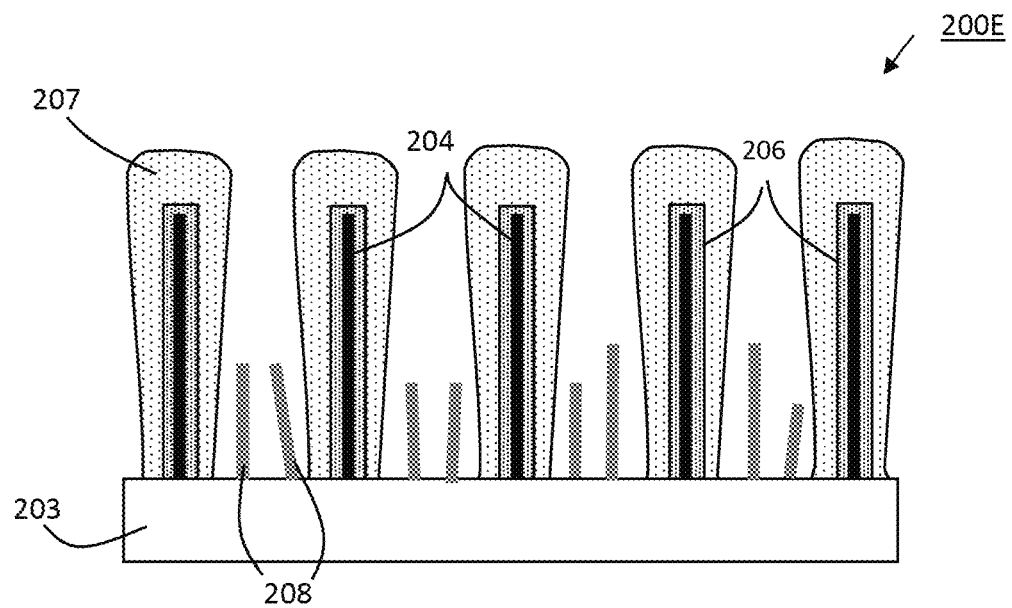

In some embodiments, as shown in FIG. 2E, anode 200E is formed where a plurality of lithium storage nanostructures 208 may be formed on the electrically conductive substrate concurrently with deposition of the lithium storage coating 207 over the second metal oxide. For example, silicon-containing nanowires and microwires can be grown from nickel-containing electrically conductive substrates. In some embodiments, the nanowires and microwires may have a nickel silicide core and an amorphous silicon shell. Some non-limiting methods of growing lithium storage filaments on metals are described in U.S. Pat. Nos. 9,325,014 and 8,257,866, the entire contents of which are incorporated by reference for all purposes.

Figure 3A:
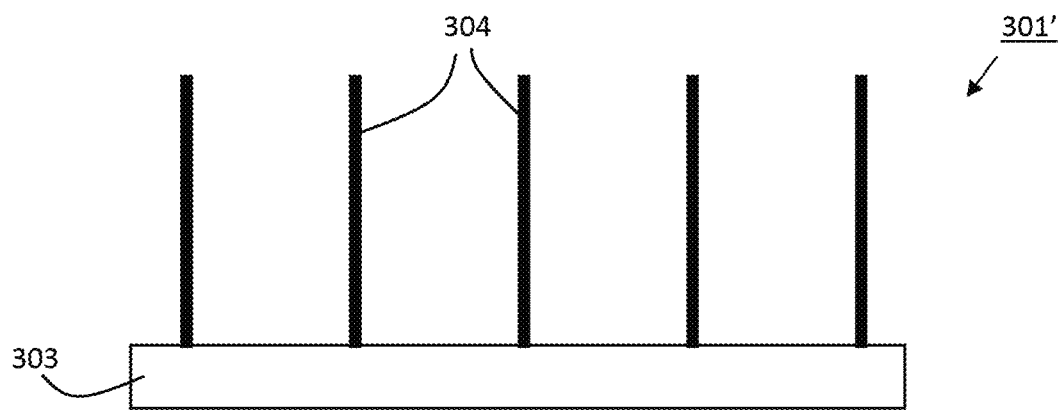
Figure 3B:
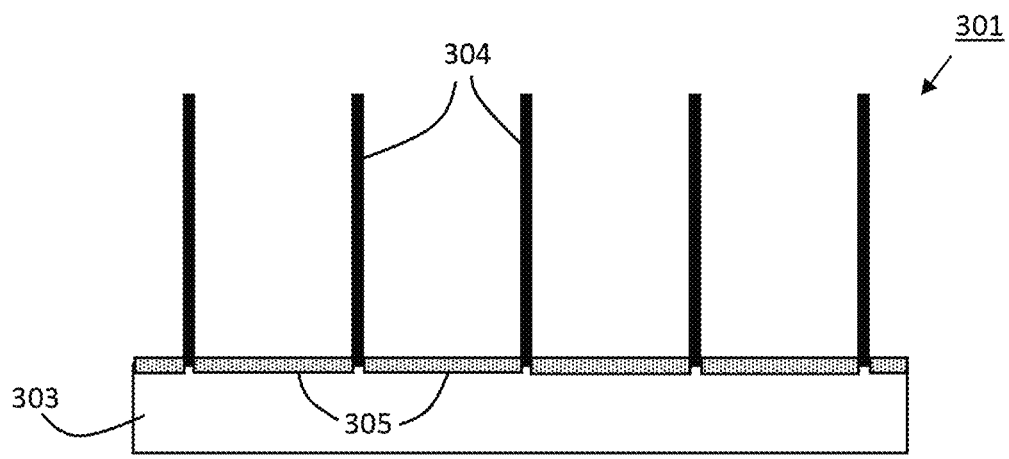
Figure 3C:
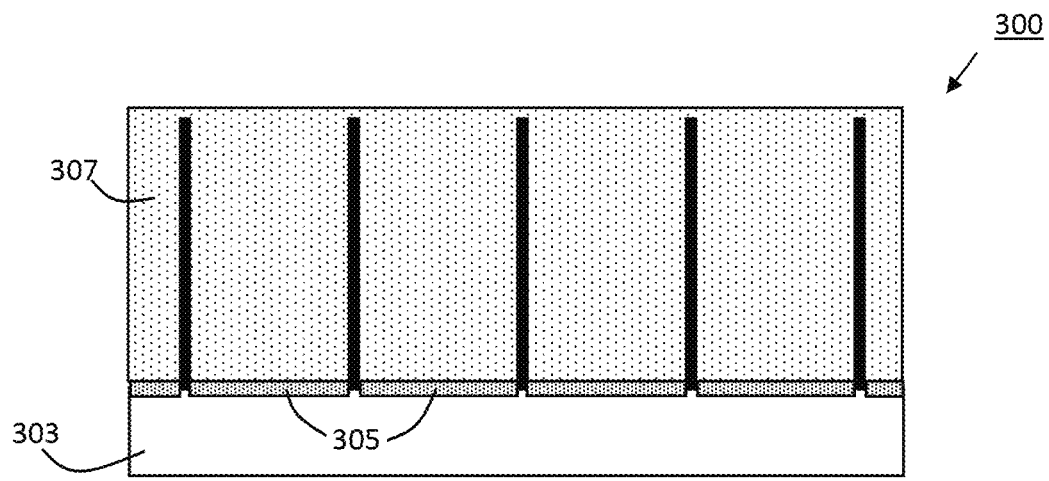

FIGS. 3A-3C are cross-sectional views illustrating the fabrication of an anode according to some embodiments of the present disclosure. In FIG. 3A, a current collector precursor 301' includes an electrically conductive substrate 303 and a plurality of electrically conductive structures 304 in electrical communication with the electrically conductive substrate 303, for example, through direct physical contact. The electrically conductive substrate 303 includes a first electrically conductive material and each of the plurality of electrically conductive structures comprises a second electrically conductive material, which may be the same as, or different than, the first electrically conductive material. Materials, methods of making, and other features of the current collector precursor 301' are discussed later.

In FIG. 3B, a metal oxide coating is provided in contact with the current collector precursor 301' to form current collector 301. In the present embodiment, the metal oxide coating includes a first metal oxide material 305 formed in contact with the electrically conductive substrate 303. Unlike FIG. 1, there is no substantial amount of metal oxide coating (e.g., less than 0.002 μm thick if any at all) in contact with electrically conductive structures 304. In some embodiments, the first metal oxide material is provided as a coating or layer over most of the available surface area of the electrically conductive substrate not otherwise occupied by the electrically conductive structures. Materials, methods of forming, and other features of the metal oxide material are discussed later.

In FIG. 3C, a lithium storage coating 307 is deposited over the current collector 301 and in contact with the first metal oxide material 305 to form anode 300. The electrically conductive structures 304 are at least partially embedded within the lithium storage coating 307. That is, the lithium storage coating includes a plurality of concavities with an electrically conductive structure present in each concavity. As shown in FIG. 3C, the electrically conductive structures 304 may be fully embedded within the lithium storage coating 307. In some embodiments, as discussed later, the lithium storage coating may include porous silicon deposited by a CVD process, for example, a PECVD process. In some embodiments, as shown in FIG. 3C, the lithium storage coating may selectively deposit on the first metal oxide material 305 and does not form an adherent coating over the electrically conductive structures. In some embodiments, the rate of the CVD reaction may be faster at the first metal oxide material surface than at the electrically conductive structures and may continue to be faster at the surface of the lithium storage coating than at the electrically conductive structures.

Figure 4A:
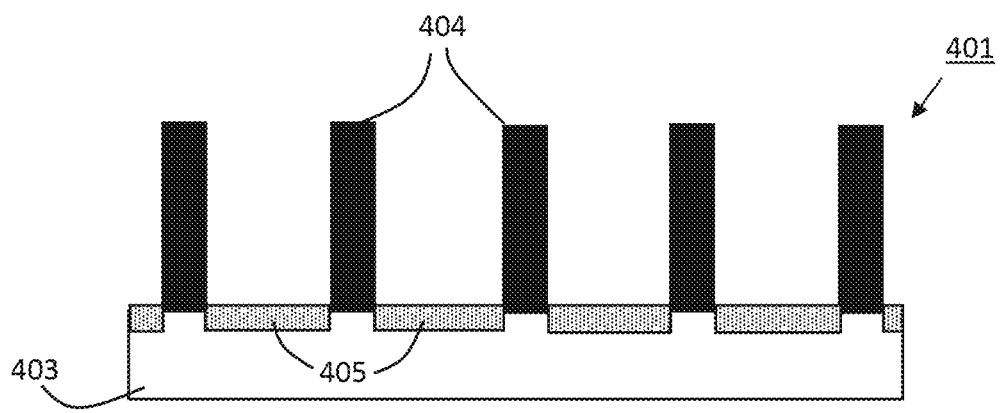
FIGS. 4A-4C are cross-sectional views illustrating the making of an anode according to some embodiment of the present disclosure.
Figure 4B:
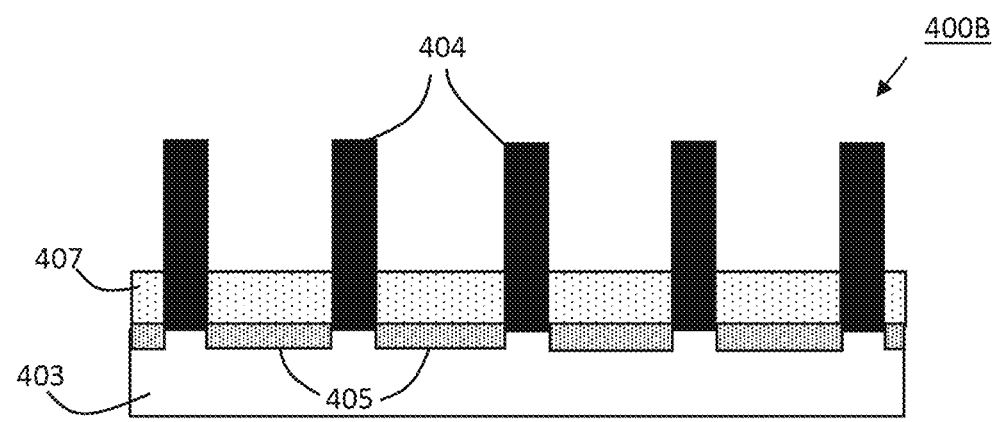
Figure 4C:
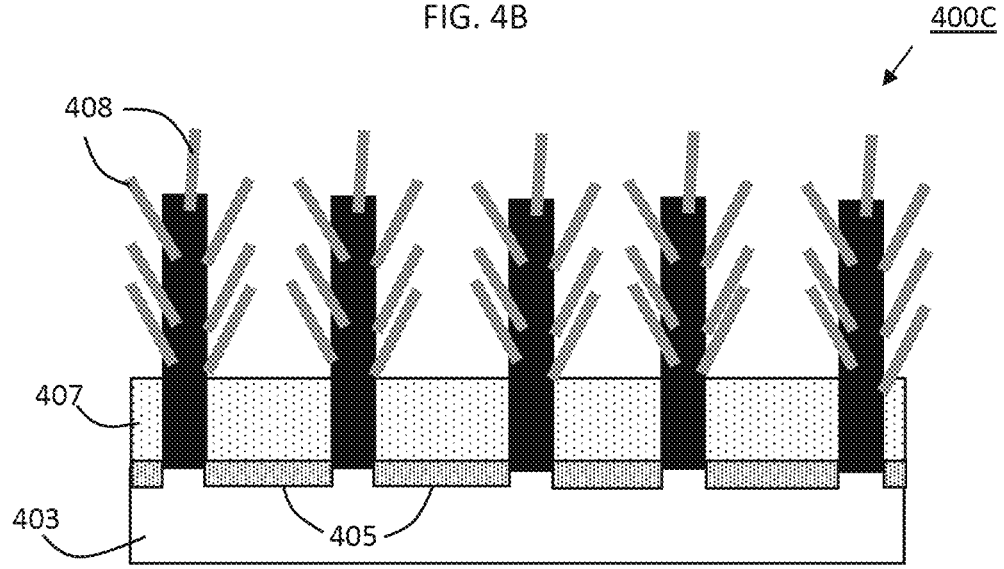

FIGS. 4A-C are cross-sectional views according to some embodiments of the present disclosure. In FIG. 4A, current collector 401 includes an electrically conductive substrate 403, and a plurality of electrically conductive structures 404 in electrical communication with electrically conductive substrate 403. A first metal oxide material 405 is in contact with electrically conductive substrate 403 in regions not occupied by the electrically conductive structures 404.

In FIG. 4B, a lithium storage coating 407 may be deposited to form anode 400B. The lithium storage coating 407 may overlay and be in contact with the first metal oxide material 405. The electrically conductive structures 404 are partially embedded within the lithium storage coating 407, but also extend beyond the lithium storage coating. In some embodiments, as discussed later, the lithium storage coating may include porous silicon deposited by a CVD process, for example, a PECVD process. In some embodiments, the lithium storage coating selectively deposits on the first metal oxide material 405. In some embodiments, the rate of a CVD reaction may be faster at the first metal oxide material surface than at the electrically conductive structures and may continue to be faster at the surface of the lithium storage coating than at the electrically conductive structure.

In some embodiments and as shown in FIG. 4C, after forming anode 400B, deposition conditions may be altered (for example, temperature may be increased) to induce growth of lithium storage filaments 408 on the electrically conductive structures 404, forming hybrid anode 400C having both a lithium storage coating(s) and lithium storage filaments. For example, silicon-containing nanowires and microwires can be grown on nickel-containing electrically conductive structures. In some embodiments, the nanowires and microwires may have a nickel silicide core and an amorphous silicon shell. Some non-limiting methods of growing lithium storage filaments are described in U.S. Pat. Nos. 9,325,014 and 8,257,866, the entire contents of which are incorporated by reference for all purposes. Additional lithium storage coating material may also deposit over the first metal oxide material 405 while the lithium storage filaments are growing.

Current Collector

In some embodiments, the electrically conductive substrate includes a first electrically conductive material. The first electrically conductive material may have a conductivity of at least 100 S/m, alternatively at least $10^3$ S/m, alternatively at least $10^6$ S/m, alternatively at least $10^7$ S/m. In some embodiments, the first electrically conductive material may include a metal. In some embodiments, the metal may be a transition metal or an alloy including a transition metal. In some embodiments, the transition metal is copper, nickel, iron, chromium, or titanium. In some embodiment, the first electrically conductive material may include stainless steel. In some embodiments, the first electrically conductive material includes an electrically conductive carbon, such as carbon black, carbon nanotubes, graphene, graphene oxide, reduced graphene oxide, and graphite. In some embodiments the electrically conductive substrate may be in the form of a mesh or some other 3-dimensional structure, a foil or a sheet of conductive material, or a layer deposited onto an insulating substrate (e.g., a polymer sheet or ceramic sheet coated with conductive material such as nickel or copper, optionally on both sides).

In some embodiments, the electrically conductive substrate includes a mesh or sheet of electrically conductive carbon, including but not limited to, those formed from bundled carbon nanotubes or nanofibers. In some embodiments, such carbon-based electrically conductive substrates may include a surface layer of a conductive metal, e.g., nickel, copper, zinc, titanium, or the like. In some embodiments, the conductive metal surface layer may be applied by electrolytic or electroless plating methods.

In some embodiments, the electrically conductive substrate has an average thickness of at least 0.1 μm, alternatively at least 1 μm, alternatively at least 5 μm. In some embodiments, the electrically conductive substrate has an average thickness in a range of 0.1 μm to 1 μm, alternatively 1 μm to 2 μm, alternatively 2 μm to 5 μm, alternatively 5 μm, to 10 μm, alternatively 10 μm to 15 μm, alternatively 15 μm to 20 μm, alternatively 20 μm to 30 μm, alternatively 30 μm to 50 μm, alternatively 50 μm to 100 μm, or any combination of contiguous ranges thereof.

Figure 5A:
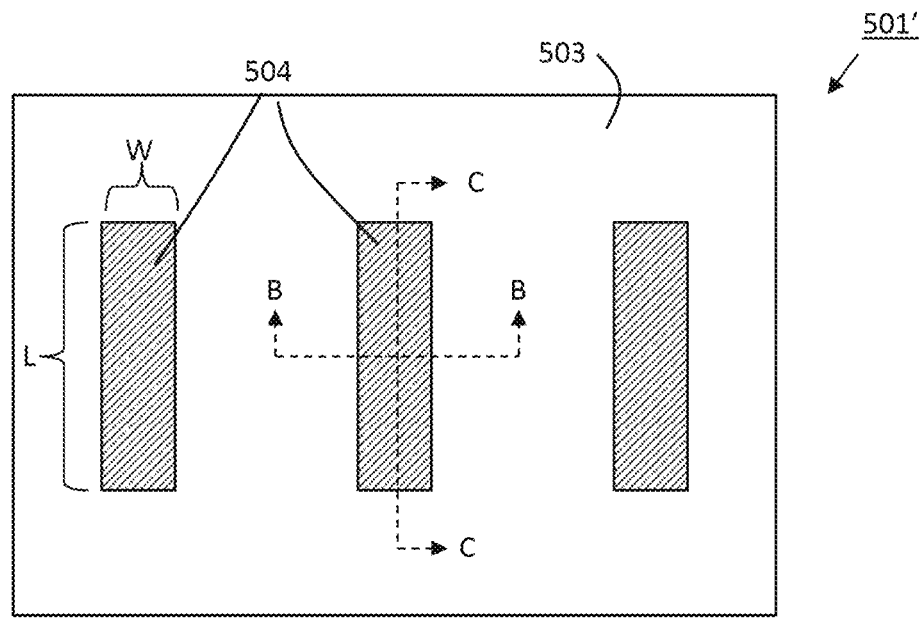
FIG. 5A is a plan view of a current collector precursor according to some embodiment of the present disclosure.
Figure 5B:
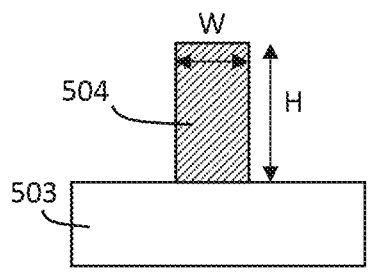
FIG. 5B is a cross-sectional view of a current collector precursor taken along cut line B-B of FIG. 5A.
Figure 5C:
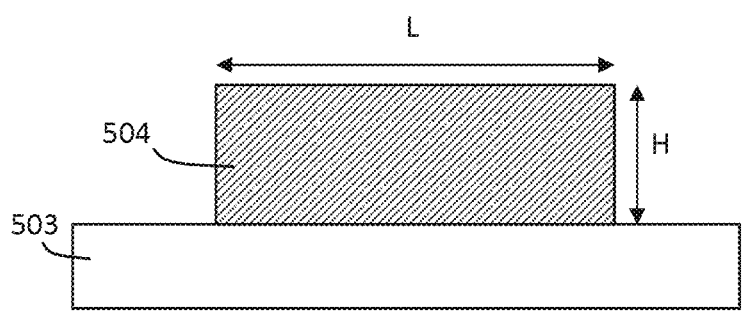
FIG. 5C is a cross-sectional view of a current collector precursor taken along cut line C-C of FIG. 5A.

Referring to FIG. 5A, there is a plan view of current collector precursor 501' having a plurality of electrically conductive structures 504 in electrical communication (e.g. in contact) with electrically conductive substrate 503. Each of the plurality of electrically conductive structures 504 is characterized by a height H measured from the electrically conductive substrate 503 to its end along a first electrically conductive structure axis. The electrically conductive structures may be further characterized by a width W and a length L, measured parallel to the electrically conductive substrate surface. In some embodiments, length L is approximately the same as W, and may be measured in a direction approximately orthogonal to the width. FIG. 5B shows a cross-sectional view of current collector precursor 501' along cut line B-B to illustrate H and W of electrically conductive structure 504. FIG. 5C shows a cross-sectional view of current collector precursor 501' along cut line C-C to illustrate H and L of the electrically conductive structure 504. In general, W represents the shortest dimension of electrically conductive structure 504 in plan view (FIG. 5A) and corresponds to the widest portion of its cross-section (FIG. 5B).

The electrically conductive structures may each have an aspect ratio defined by height H divided by width W that is generally at least 1, alternatively at least 2, alternatively at least 5, alternatively at least 10. In some embodiments, the aspect ratio may be in a range of 1 to 2, alternatively 2 to 5, alternatively 5 to 10, alternatively 10 to 20, alternatively 20 to 50, alternatively 50 to 100, alternatively 100 to 200, alternatively 200 to 500, alternatively in a range of 500 to 1000, or any combination of contiguous ranges thereof. There is no particular limitation on the length L of the electrically conductive structure other than it is by definition at least the same as width W, or greater. Referring again to FIG. 5A, a portion of the surface area of the electrically conductive substrate is in occupied by or in contact with the electrically conductive structures ("occupied area"). In some embodiments, the occupied area is at least 1% and less than 99%. In some embodiments, the occupied area is in a range of 2% to 10%, alternatively 10% to 20%, alternatively 20% to 30%, alternatively 30% to 40%, alternatively 40% to 50%, alternatively 50% to 60%, alternatively 60% to 70%, alternatively 70% to 80%, alternatively 80% to 90%, alternatively 90% to 98%, or any combination of contiguous ranges thereof.

In some embodiments, the surface area of the electrically conductive substrate includes 2 to 5 electrically conductive structures per square centimeter, alternatively 5 to 10, alternatively 10 to 50, alternatively 50 to 100, alternatively 100 to 500, alternatively 500 to 1000, alternatively 1000 to 10,000, alternatively 5000 to 10,000, alternatively 10,000 to 100,000, alternatively 100,000 to 1,000,000, alternatively 1,000,000 to 10,000,000 electrically conductive structures, or an any combination of contiguous ranges thereof. In some embodiments, the surface area of the electrically conductive substrate includes at least 5 electrically conductive structures per square centimeter, alternatively at least 10, alternatively at least 100, alternatively at least 1000, alternatively at least 10,000, alternatively at least 100,000, or alternatively at least 1,000,000 electrically conductive structures.

In some embodiments, the height H of each of the plurality the electrically conductive structures may be at least 1 µm, alternatively at least 5 µm, alternatively at least 10 µm, alternatively at least 20 µm. In some embodiments, the average height H of the electrically conductive structures is in a range of 1 µm to 2 µm, alternatively 2 µm to 5 µm, alternatively 5 µm to 10 µm, alternatively 10 µm to 15 µm, alternatively 15 µm to 20 µm, alternatively 20 µm to 50 µm, alternatively 50 µm to 100 µm, or any combination of contiguous ranges thereof. In some embodiments, the electrically conductive structure has a cross-sectional width of at least 0.002 µm, alternatively at least 0.005 µm, alternatively at least 0.010 µm, alternatively at least 0.10 µm, alternatively at least 1.0 µm, alternatively at least 10 µm, alternatively at least 20 µm.

Figure 6A:
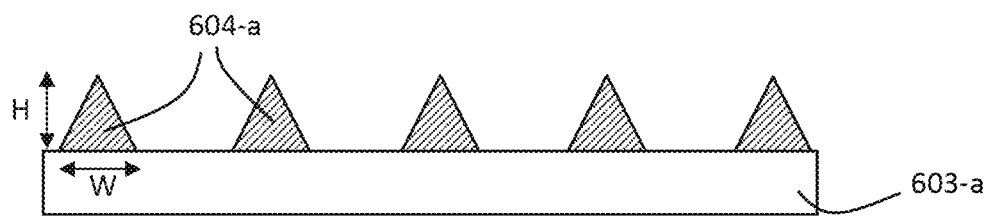
FIGS. 6A-6H are cross-sectional views of current collector precursors illustrating various shapes available for the electrically conductive structures according to some embodiments of the present disclosure.
Figure 6B:
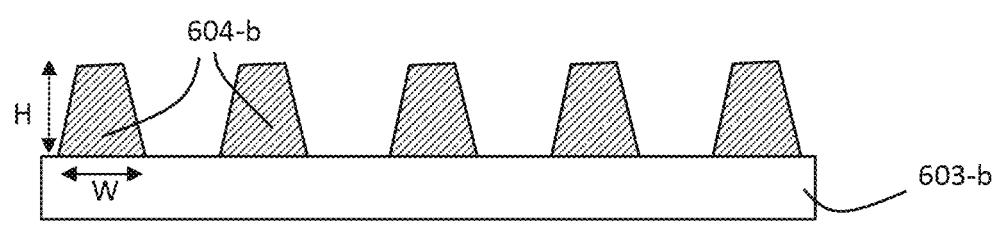
Figure 6C:
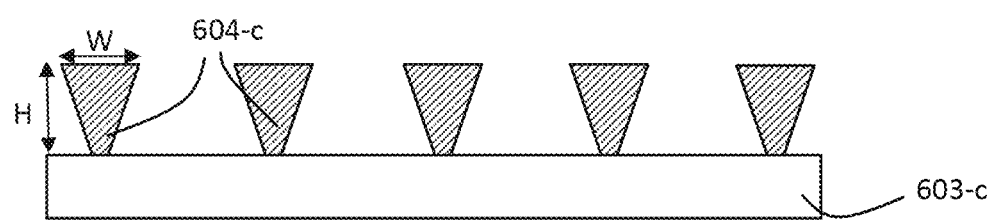
Figure 6D:
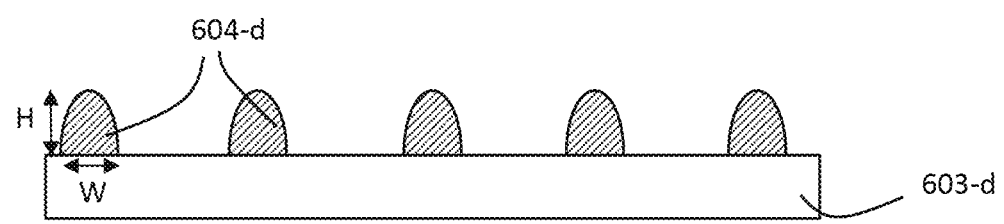
Figure 6E:
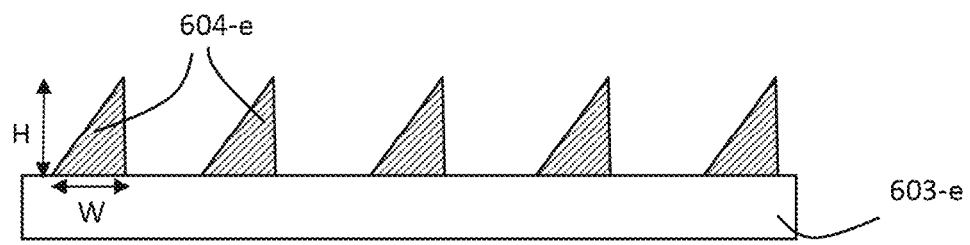
Figure 6F:
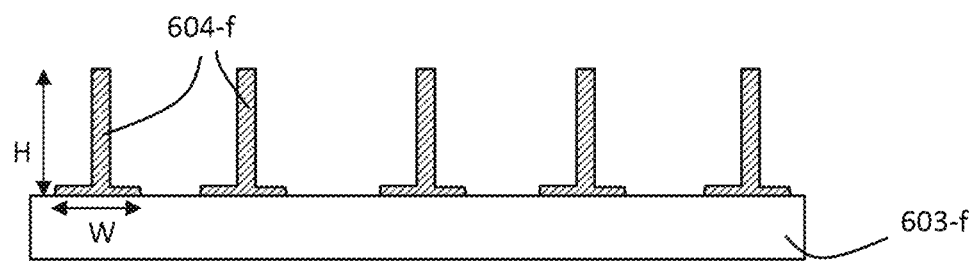
Figure 6G:
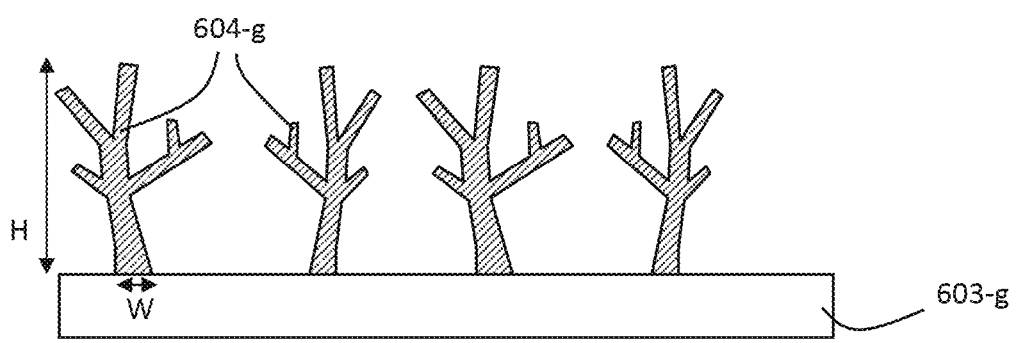
Figure 6H:
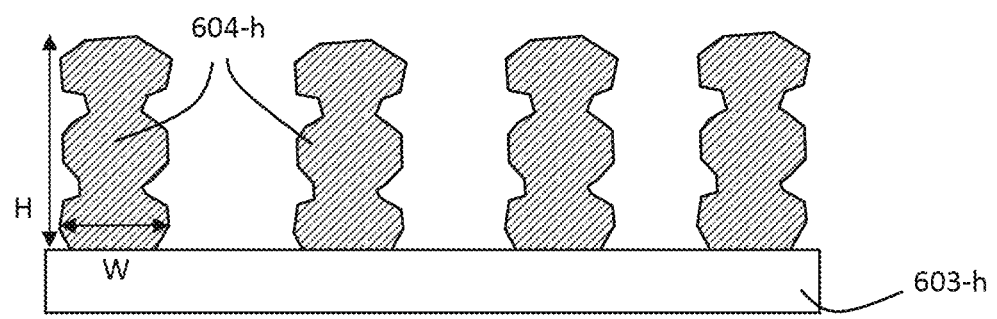

There are a wide variety of shapes the electrically conductive structures may take, including but not limited to, wires, pillars, tubes, ridges, or dendrites. FIGS. 6A-6H illustrate cross-sectional views of some non-limiting examples of electrically conductive structures 604-a-604-h provided over electrically conductive substrate 603-a-603-h. Height H and width W are also noted. In FIG. 6A, the electrically conductive structures 604-a may have a triangular shape in cross-section. Such structures may for example may be conical or pyramidal. In FIG. 6B, the electrically conductive structures 604-b may have a trapezoidal shape in cross-section. In FIG. 6C, the electrically conductive structures 604-c may have an inverted trapezoidal shape in cross-section. In FIG. 6D, the electrically conductive structures 604-d may have a circular, oval, or ellipsoidal shape in cross-section. In FIG. 6E, the electrically conductive structures 604-e may have a right-triangular or wedge shape in cross-section. In FIG. 6F, the electrically conductive structures 604-f may have a base-and-pillar shape in cross-section. With a base-and-pillar shape, the aspect ratio may be in terms of the pillar width instead of the base width. In FIG. 6G, electrically conductive structures 604-g may have a dendritic or branched shape in cross section. For such structures, W is defined by the maximum width of a branch or "trunk" (the portion in contact with the electrically conductive substrate), not the spread of branches. In FIG. 6H, electrically conductive structures 604-h may have an irregular or nodular shape in cross-section.

Figure 7:
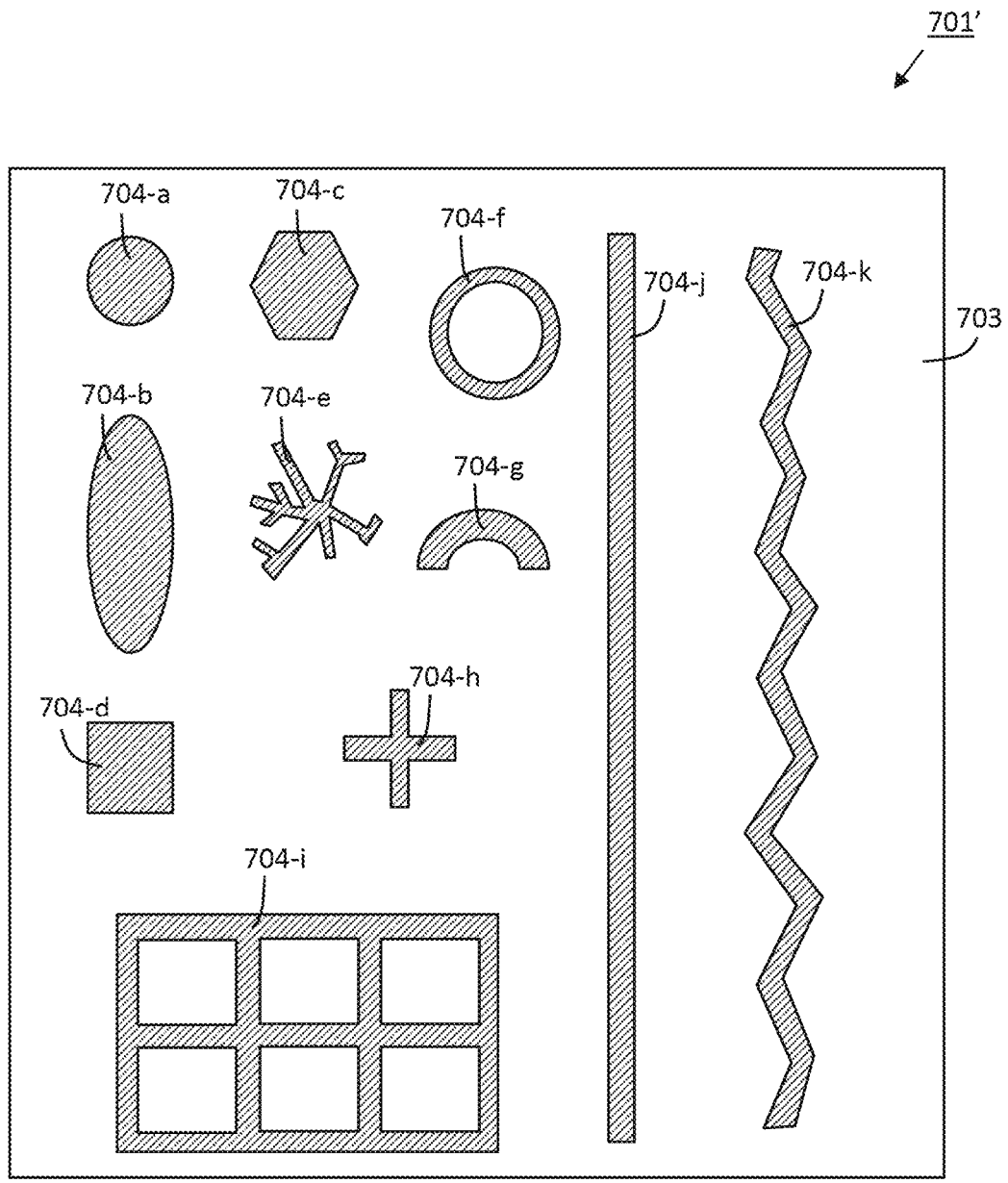
FIG. 7 is a plan view of a current collector precursor illustrating various shapes for the electrically conductive structures according to some embodiments of the present disclosure.

FIG. 7 illustrates a plan view of some additional non-limiting examples of variously-shaped electrically conductive structures 704-a-704-k, over electrically conductive substrate 703 that may make up current collector precursor 701'. For convenience only one example of each electrically conductive structure is shown. A current collector precursor may include just one type of shape or a plurality of shapes. The cross-sectional views of FIG. 6 may be combined with almost any of the structures of FIG. 7. The plan view shapes may appear circular (704-a), oblong or elliptical (704-b), polygonal such as hexagonal (704-c), square (704-d), branched or dendritic (704-e), tubular (704-f), crescent (704-g), intersected such as a cross (704-h) or as part of an interconnected mesh (704i), or as a long ridge, that may be straight (704-j) or sinusoidal (704-k). In some embodiments, when the electrically conductive structures are oblong or ridge-like, they may be provided parallel to an axis of winding, e.g., when assembling jelly-roll type batteries in in roll-to-roll manufacturing methods.

The electrically conductive structures may include a second electrically conductive material that may be substantially the same as or different than the first electrically conductive material. In some embodiments, when the electrically conductive material includes a metal "substantially the same as" may mean that the atomic % of each element of the first electrically conductive material is within 2 atomic % of the second electrically conductive material. In some embodiments, when the electrically conductive materials include conductive carbon materials, "substantially the same" may mean that the weight % of each form of conductive carbon material of the first electrically conductive material is within 2 weight % of each form of conductive carbon material in the second electrically conductive material. The second electrically conductive material may have a conductivity of at least 1 S/m, alternatively, at least 10 S/m, alternatively at least 100 S/m, alternatively at least $10^3$ S/m, alternatively at least $10^6$ S/m, alternatively at least $10^7$ S/m, In some embodiments, the conductivity of the second electrically conductive material is lower than the conductivity of the first electrically conductive material. In some embodiments, the second electrically conductive material may include a metal. In some embodiments, the metal may be a transition metal or an alloy including a transition metal. In some embodiments, the transition metal is copper, nickel, iron, chromium, or titanium. In some embodiments, the second electrically conductive material may include a metal silicide. In some embodiment, the second electrically conductive material includes an electrically conductive carbon, such as carbon black, carbon nanotubes, graphene, graphene oxide, reduced graphene oxide, and graphite. In some embodiments, the electrically conductive structures include carbon nanotubes. In some embodiments, the carbon nanotubes may be embedded in the electrically conductive substrate, for example, as disclosed in U.S. Pat. Nos. 9,257,704 or 10,008,717, the entire contents are incorporated herein for all purposes. In some embodiments, the second electrically conductive material may include a an electrically conductive doped oxide, including but not limited to, indium-doped tin oxide (ITO) or an aluminum-doped zinc oxide (AZO).

In some embodiments, electrically conductive metal structures may be pattern deposited over an electrically conductive substrate by a PVD method such as evaporation through a shadow mask. In some embodiments metallic electrically conductive structures may be electrolytically or electrolessly plated through a patterned resist (e.g. a photoresist) overlaying the electrically conductive substrate followed by removal of the resist. Such photolithographic methods are well known in the art. In some embodiments, metallic electrically conductive structures may be randomly grown by high-current or pulse electroplating. In some embodiments, electrically conductive structures may be formed by patterned etching the electrically conductive substrate, for example, using a patterned resist or photoresist to block etching in the desired pattern. Etching may be include a "wet" chemical etchant, or a dry etching process such as a plasma etching method. Since the electrically conductive structures are formed from the electrically conductive substrate, the first and second electrically conductive materials may be the same. Etching can readily produce electrically conductive structures having an aspect ratio of 1, but higher aspect ratios may require anisotropic etching methods as is known in the art.

In some embodiments, electrically conductive structures may be deposited or grown in the form of filaments, nanowires, or the like. Methods of forming metal filaments and nanowires or carbon nanotubes are well known in the art, including but not limited to CVD-based methods using filament growth promoting materials. In some embodiments, a filament growth promoting material is provided over the electrically conductive substrate. In some embodiments, the filament growth promoting material is a vapor-liquid-solid (VLS) filament growth promoting material. In some embodiments, the filament growth promoting material is provided by a substantially continuous layer over the electrically conductive substrate. In some embodiments, the filament growth promoting material may be provided as a patterned layer or as a layer of discontinuous islands over the electrically conductive substrate. In some embodiments, the electrically conductive substrate itself includes the filament growth promoting material. Non-limiting examples of filament growth materials may include non-refractory transition metals and their alloys. The growth promoting material may include, for example, nickel, gold, palladium, platinum, ruthenium, aluminum, indium, gallium, tin, or iron, or their alloys. The temperature depends on the growth material and filament precursor gas, but in some embodiments may be at least 100° C., alternatively from 100° C. to 200° C., alternatively from 200° C. to 300° C., 300° C., alternatively from 300° C. to 400° C., alternatively from 400° C. to 500° C., alternatively from 500 ° C. to 600° C., alternatively from 600° C. to 700° C., alternatively from 700° C. to 800° C., alternatively from 800° C. to 900° C., or any combination of contiguous ranges thereof.

In some embodiments, the electrically conductive structures include a metal silicide or a metal-germanium alloy. The silicide or germanium alloy may include a transition metal including, but not limited to, nickel or copper. In some embodiments, the silicide or germanium alloy may be deposited in the form of filaments using a CVD process and VLS growth materials along with a silicon- or germanium-containing precursor gas.

In some embodiments, the electrically conductive structures may include nanostructures. The term "nanostructure" herein generally refers to a structure having at least one cross-sectional dimension that is less than about 2,000 nm, other than a dimension approximately normal to an underlying substrate (such as a layer thickness) and excluding dimensions caused by random pores. Similarly, the terms "nanowires", "nanopillars", and "nanotubes" refers to wires, pillars, and tubes, respectively, at least a portion of which, have a diameter of less than 2,000 nm.

Unless otherwise noted, the discussion below regarding metal oxide materials and methods of forming them are generally applicable to both the first metal oxide material and the second metal oxide material.

The metal oxide material may be stoichiometric or non-stoichiometric. The metal oxide may include a mixture of metal oxides having homogeneously or heterogeneously distributed oxide stoichiometries, mixtures of metals or both. The metal oxide material should be sufficiently electrically conductive to allow transfer of electrical charge between the current collector and the lithium storage coating. In some embodiments, the metal oxide material may include dopants or regions of unoxidized metal that promote electrical conductivity.

In some embodiments, the metal oxide material includes a transition metal oxide, e.g., an oxide of nickel, zinc, titanium, or copper. In some embodiments, the metal oxide material may include an alkali metal oxide or an alkaline earth metal oxide. In some embodiments the metal oxide material includes an oxide of lithium. The metal oxide material may include a mixture of metals. For example, an "oxide of nickel" may optionally include other metals in addition to nickel. In some embodiments, the metal oxide material includes an oxide of an alkali metal (e.g., lithium or sodium) or an alkaline earth metal (e.g., magnesium or calcium) along with an oxide of a transition metal (e.g., nickel, zinc, titanium, or copper). The metal oxide material may include a stoichiometric metal oxide, a non-stoichiometric metal oxide, or both. In some embodiments, the metal within the metal oxide may exist in multiple oxidation states. In some embodiments the metal oxide may have a gradient of oxygen content where the atomic % of oxygen near the electrically conductive substrate or the electrically conductive structures is less than the atomic % away electrically conductive substrate or the electrically conductive structures, respectively.

In some embodiments, the first metal oxide material may have an average thickness of at least 0.005 μm, alternatively at least 0.01 μm, alternatively at least 0.02 μm, alternatively at least 0.05 μm, alternatively 0.1 μm, alternatively at least 0.2 μm, alternatively at least 0.5 μm. In some embodiments, the first metal oxide material has an average thickness in a range of about 0.005 μm to about 0.01 μm, alternatively about 0.01 μm to about 0.02 μm, alternatively about 0.02 μm to about 0.05 μm, alternatively about 0.05 μm to about 0.1 μm, alternatively about 0.1 μm to about 0.2 μm, alternatively about 0.2 μm to about 0.5 μm, alternatively about 0.5 μm to about 1 μm, alternatively about 1 μm to about 2 μm, alternatively about 2 μm to about 5 μm, alternatively about 5 μm to about 1 μm, or any combination of contiguous ranges thereof.

In some embodiments, the second metal oxide material may have an average thickness of at least 0.001 μm, alternatively at least 0.002 μm, alternatively at least 0.005 μm , alternatively at least 0.01 μm, alternatively at least 0.02 μm, alternatively at least 0.05 μm, alternatively 0.1 μm, alternatively at least 0.2 μm, alternatively at least 0.5 μm. In some embodiments, the second metal oxide material has an average thickness in a range of about 0.005 μm to about 0.01 μm, alternatively about 0.01 μm to about 0.02 μm, alternatively about 0.02 μm to about 0.05 μm, alternatively about 0.05 μm to about 0.1 μm, alternatively about 0.1 μm to about 0.2 μm, alternatively about 0.2 μm to about 0.5 μm, alternatively about 0.5 μm to about 1 μm, alternatively about 1 μm to about 2 μm, alternatively about 2 μm to about 5 μm, alternatively about 5 μm to about 1 μm, or any combination of contiguous ranges thereof. In some embodiments, the thickness of the second metal oxide material is less than the thickness of the first metal oxide material.

In some embodiments, the first metal oxide material has a composition that is substantially the same as the composition of the second metal oxide material. In some embodiments, "substantially the same as" may mean that the atomic % of each element of the first metal oxide material is within 2 atomic % of the second metal oxide material.

In some embodiments, the metal oxide material may be directly deposited by atomic layer deposition (ALD), a chemical vapor deposition (CVD) process, evaporation, or sputtering. Such methods may be used to form current collector shown in FIG. 1. In some embodiments, the electrically conductive substrate or electrically conductive structures includes a metal that can be oxidized. For example, a surface portion of the electrically conductive substrate or electrically conductive structures can be thermally oxidized in the presence of oxygen, electrolytically oxidized, chemically oxidized in an oxidizing liquid or gaseous medium or the like to form the metal oxide material at a desired thickness. If both the first and second electrically conductive materials are readily oxidized, such method may be used to form the current collector shown in FIG. 1. In some embodiments, the first metal oxide material may be selectively oxidized by using a first electrically conductive material that is more easily oxidized than the second electrically conductive material. Such method may be used to form the current collectors as shown in FIGS. 3 and 4. In some embodiments, the second metal oxide material may be selectively oxidized by using a second electrically conductive material that is more easily oxidized than the first electrically conductive material. Such method may be used to form the current collector shown in FIG. 2.

In some embodiments, a metal oxide precursor composition may be applied and treated to form the metal oxide material. Some non-limiting examples of metal oxide precursor compositions include sol-gels (metal alkoxides), metal carbonates, metal acetates (including organic acetates), metal hydroxides, and metal oxide dispersions. The metal oxide precursor composition may be thermally treated to form the metal oxide material. In some embodiments, room temperature may be sufficient temperature to thermally treat the precursor. In some embodiments, a metal oxide precursor composition is thermally treated by exposure to a temperature of at least 50° C., alternatively in a range of 50° C. to 150° C., alternatively in a range of 150° C. to 250° C., alternatively in a range of 250° C. to 350° C., alternatively in a range of 350 ° C. to 450° C., or any combination of these ranges. Thermal treatment time depends on many factors, but may optionally be at least 0.1 minute, alternatively in a range of 1 to 120 minutes, to form the metal oxide material. In some embodiments, thermal treatment may be carried out using an oven, infrared heating elements, contact with a hot plate or exposure to a flash lamp. In some embodiments, the metal oxide precursor composition is treated by exposure to reduced pressure to form the metal oxide, e.g., to drive off solvents or volatile reaction products. The reduced pressure may be less than 100 Torr, alternatively in a range of 0.1 to 100 Torr. Exposure time to the reduced pressure may optionally be at least 0.1 minute, alternatively in a range of 1 to 120 minutes. In some embodiments, both reduced pressure and thermal treatment may be used.

In some embodiments, the metal oxide material may be formed in the same chamber as, or in line with, a tool used to deposit the lithium storage coating. Doped metal oxide materials can be formed by adding dopants or dopant precursors during the metal oxide formation step, or alternatively by adding dopants or dopant precursors to a surface over which the metal oxide is to be formed. In some embodiments, the metal oxide itself may have some reversible or irreversible lithium storage capacity. In some embodiments, the reversible capacity of the metal oxide material is lower than that of the lithium storage coating. In some embodiments, the metal oxide material may be porous. In some embodiments, a porous metal oxide may have a density lower than the density of the corresponding non-porous metal oxide. In some embodiments, the density of a porous metal oxide is in a range of 50% to 60% of the density of the non-porous metal oxide, alternatively 60% to 70%, alternatively 70% to 80%, alternatively 80% to 90%, alternatively 90% to 95%, alternatively 95% to 99%, or any combination of contiguous ranges thereof.

Lithium Storage Coating

The lithium storage coating includes a material (optionally porous) capable of reversibly incorporating lithium. In some embodiments, the lithium storage coating includes silicon, germanium or a mixture of both. In some embodiments, the lithium storage coating includes antimony or tin. In some embodiments, the lithium storage coating is substantially amorphous. In some embodiments, the lithium storage coating includes substantially amorphous silicon. Such substantially amorphous storage layers may include a small amount (e.g., less than 20 atomic %) of crystalline material dispersed therein. The lithium storage coating may include dopants such as hydrogen, boron, phosphorous, sulfur, fluorine, aluminum, gallium, indium, arsenic, antimony, bismuth, nitrogen, or metallic elements. In some embodiments the lithium storage coating may include porous substantially amorphous hydrogenated silicon (a-Si:H), having, e.g., a hydrogen content of from 0.1 to 20 atomic %, or alternatively higher. In some embodiments, the lithium storage coating may include methylated amorphous silicon. Note that, unless referring specifically to hydrogen content, any atomic % metric used herein for a lithium storage material or coating refers to all atoms other than hydrogen.

In some embodiments, the lithium storage coating includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, the lithium storage coating includes at least 40 atomic % silicon, alternatively at least 50 atomic %, alternatively at least 60 atomic %, alternatively at least 70 atomic %, alternatively, at least 80 atomic %, alternatively at least 90 atomic %, alternatively at least 95 atomic %, alternatively at least 97 atomic %.

In some embodiments, the lithium storage coating includes less than 10 atomic % carbon, alternatively less than 5 atomic %, alternatively less than 2 atomic %, alternatively less than 1 atomic %, alternatively less than 0.5 atomic %. In some embodiments, the lithium storage coating includes less than 5% by weight, alternatively less than 1% by weight, of carbon-based binders, carbon nanotubes, graphitic carbon, graphene, graphene oxide, reduced graphene oxide, carbon black, and conductive carbon.

The lithium storage coating includes voids or interstices (pores), which may be random or non-uniform with respect to size, shape and distribution. Such porosity does not result in, or a result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 µm in any dimension, alternatively smaller than about 3 µm, alternatively smaller than about 2 µm. In some embodiments, the lithium storage coating may include some pores that are smaller than 100 nm in any dimension, alternatively smaller than 50 nm in any dimension, alternatively smaller than 20 nm in any dimension. In some embodiments the lithium storage coating has an average density in a range of 1.0-1.1 g/cm$^3$, alternatively 1.1-1.2 g/cm$^3$, alternatively 1.2-1.3 g/cm$^3$, alternatively 1.3-1.4 g/cm$^3$, alternatively 1.4-1.5 g/cm$^3$, alternatively 1.5-1.6 g/cm$^3$, alternatively 1.6-1.7 g/cm$^3$, alternatively 1.7-1.8 g/cm$^3$, alternatively 1.8-1.9 g/cm$^3$, alternatively 1.9-2.0 g/cm$^3$, alternatively 2.0-2.1 g/cm$^3$, alternatively 2.1-2.2 g/cm$^3$, alternatively 2.2-2.25 g/cm$^3$, or any combination of contiguous ranges thereof, and includes at least 40 atomic % silicon, alternatively at least 50 atomic % silicon, alternatively at least 60 atomic % silicon, alternatively at least 70 atomic % silicon, alternatively 80 atomic % silicon, alternatively at least 90 atomic % silicon, alternatively at least 95 atomic % silicon.

In some embodiments, the lithium storage coating may be described as a matrix of interconnected silicon, germanium or alloys thereof, with random pores and interstices embedded therein. In some embodiments, the lithium storage coating has a sponge-like form. In some embodiments, about 75% or more of the metal oxide coating surface is contiguous with the lithium storage coating, at least prior to electrochemical formation. It should be noted that the lithium storage coating does not necessarily extend across the entire anode without any lateral breaks and may include random discontinuities or cracks and still be considered continuous.

In some embodiments, the lithium storage coating includes a substoichiometric oxide of silicon (SiO$_x$), germanium (GeO$_x$) or tin (SnO$_x$) wherein the ratio of oxygen atoms to silicon, germanium or tin atoms is less than 2:1, i.e., x<2, alternatively less than 1:1, i.e., x<1. In some embodiments, x is in a range of 0.02 to 0.95, alternatively 0.02 to 0.10, alternatively 0.10 to 0.50, or alternatively 0.50 to 0.95, alternatively 0.95 to 1.25, alternatively 1.25 to 1.50, or any combination of contiguous ranges thereof.

In some embodiments, the lithium storage coating includes a substoichiometric nitride of silicon (SiN$_y$), germanium (GeN$_y$) or tin (SnN$_y$) wherein the ratio of nitrogen atoms to silicon, germanium or tin atoms is less than 1.25:1, i.e., y<1.25. In some embodiments, y is in a range of 0.02 to 0.95, alternatively 0.02 to 0.10, alternatively 0.10 to 0.50, or alternatively 0.50 to 0.95, alternatively 0.95 to 1.20, or any combination of contiguous ranges thereof.

In some embodiments, the lithium storage coating includes a substoichiometric oxynitride of silicon (SiO$_x$N$_y$), germanium (GeO$_x$N$_y$), or tin (SnO$_x$N$_y$) wherein the ratio of total oxygen and nitrogen atoms to silicon, germanium or tin atoms is less than 1:1, i.e., (x+y)<1. In some embodiments, (x+y) is in a range of 0.02 to 0.95, alternatively 0.02 to 0.10, alternatively 0.10 to 0.50, or alternatively 0.50 to 0.95, or any combination of contiguous ranges thereof.

In some embodiments, the above sub-stoichiometric oxides, nitrides or oxynitrides are provided by a CVD process, including but not limited to, a PECVD process. The oxygen and nitrogen may be provided uniformly within the lithium storage coating, or alternatively the oxygen or nitrogen content may be varied as a function of storage layer thickness.

In some embodiments, a lithium storage coating may include two or more sublayers, optionally continuous and/or porous lithium storage sublayers, having different compositions. In some embodiments, the lithium storage coating, optionally a continuous and/or porous lithium storage coating, includes a gradient of components, density, or porosity, or a combination thereof.

Additional Lithium Storage Materials

In some embodiments, conventional lithium-ion battery slurries based on carbon that may optionally further include silicon particles, may be coated over anodes of the present disclosure to further enhance charge capacity. Coating methods may include curtain coating, slot coating, spin coating, inkjet, coating, spray coating, or any other suitable method.

CVD

CVD generally involves flowing a precursor gas, a gasified liquid in terms of direct liquid injection CVD or gases and liquids into a chamber containing one or more objects, typically heated, to be coated. Chemical reactions occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage coating, the metal oxide coating, a supplemental layer (see below) or other layer. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As mentioned, the lithium storage coating, e.g., a layer of silicon or germanium or both, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD is used to deposit a substantially amorphous silicon layer (optionally doped) over the metal oxide coating. In some embodiments, PECVD is used to deposit a substantially amorphous porous silicon coating over the metal oxide coating.

PECVD

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used. Some non-limiting examples of useful PECVD tools include hollow cathode tube PECVD, magnetron confined PECVD, inductively coupled plasma chemical vapor deposition (ICP-PECVD, sometimes called HDPECVD, ICP-CVD or HDCVD), and expanding thermal plasma chemical vapor deposition (ETP-PECVD).

PECVD process conditions (temperatures, pressures, precursor gases, carrier gasses, dopant gases, flow rates, energies, and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon, or xenon, optionally one or more dopant gases, and substantially no hydrogen. In some embodiments, the gases may include argon, silane, and hydrogen, and optionally some dopant gases. In some embodiments the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3-5, alternatively 5-10, alternatively 10-15, alternatively 15-20, or any combination of contiguous ranges thereof. In some embodiments, the gas flow ratio of hydrogen gas to silane gas is in a range of 0-0.1, alternatively 0.1-0.2, alternatively 0.2-0.5, alternatively 0.5-1, alternatively 1-2, alternatively 2-5, or any combination of contiguous ranges thereof. In some embodiments, higher porosity silicon may be formed and/or the rate of silicon deposition may be increased when the gas flow ratio of silane relative to the combined gas flows of silane and hydrogen increases. In some embodiments a dopant gas is borane or phosphine, which may be optionally mixed with a carrier gas. In some embodiments, the gas flow ratio of dopant gas (e.g., borane or phosphine) to silicon source gas (e.g., silane) is in a range of 0.0001-0.0002, alternatively 0.0002-0.0005, alternatively 0.0005-0.001, alternatively 0.001-0.002, alternatively 0.002-0.005, alternatively 0.005-0.01, alternatively 0.01-0.02, alternatively 0.02-0.05, alternatively 0.05-0.10, or any combination of contiguous ranges thereof. Such gas flow ratios described above may refer to the relative gas flow, e.g., in standard cubic centimeter per minute (SCCM). In some embodiments, the PECVD deposition conditions and gases may be changed over the course of the deposition.

In some embodiments, the temperature at the current collector during at least a portion of the time of PECVD deposition is in a range of 100° C. to 200° C., alternatively 200° C. to 300° C., alternatively 300° C. to 400° C., alternatively 400° C. to 500° C., alternatively 500° C. to 600° C., or any combination of contiguous ranges thereof. In some embodiments, the temperature may vary during the time of PECVD deposition. For example, the temperature during early times of the PECVD may be higher than at later times. Alternatively, the temperature during later times of the PECVD may be higher than at earlier times.

The thickness or mass per unit area of the lithium storage coating depends on the storage material, desired charge capacity and other operational and lifetime considerations. Increasing the thickness typically provides more capacity. If the lithium storage coating becomes too thick, electrical resistance may increase and the stability may decrease. In some embodiments, the anode may be characterized as having an active silicon areal density of at least 0.5 $mg/cm^2$, alternatively at least 1.0 $mg/cm^2$, alternatively at least 1.5 $mg/cm^2$, alternatively at least 3$mg/cm^2$, alternatively at least 5 $mg/cm^2$. In some embodiments, the lithium storage structure may be characterized as having an active silicon areal density in a range of 0.5-1.5 $mg/cm^2$, alternatively 1.5-2 $mg/cm^2$, alternatively in a range of 2-3 $mg/cm^2$, alternatively in a range of 3-5 $mg/cm^2$, alternatively in a range of 5-10 $mg/cm^2$, alternatively in a range of 10-15 $mg/cm^2$, alternatively in a range of 15-20 $mg/cm^2$, or any combination of contiguous ranges thereof. "Active areal silicon density" refers to the silicon in electrical communication with the current collector that is available for reversible lithium storage at the beginning of cell cycling, e.g., after anode "electrochemical formation" discussed later. "Areal" of this term refers to the total surface area of the electrically conductive substrate (including area occupied by the electrically conductive structures, excluding the surface area of the electrically conductive structures themselves). In some embodiments, not all of the silicon content is active silicon, i.e., some may be tied up in the form of non-active silicides or electrically isolated from the current collector.

The lithium storage coating may be characterized as having a thickness that may be measured from an outer surface of the lithium storage coating to the nearest metal oxide material. In some embodiments, the thickness of the lithium storage coating varies as a function of location on the current collector. In some embodiments the lithium storage coating has an average thickness of at least 0.5 µm, alternatively ate least 1µm, alternatively at least 3µm, alternatively at least 7µm. In some embodiments, the lithium storage coating has an average thickness in a range of about 0.5 µm to about 50 µm. In some embodiments, the lithium storage coating comprises at least 85 atomic % amorphous silicon and has a thickness in a range of 0.5 to 1 µm, alternatively 1-2 µm, alternatively 2-4 µm, alternatively 4-7 µm, alternatively 7-10 µm, alternatively 10-15 µm , alternatively 15-20 µm, alternatively 20-25 µm, alternatively 25-30 µm, alternatively 30-40 µm, alternatively 40-50 µm, or any combination of contiguous ranges thereof.

In some embodiments, the lithium storage coating includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the lithium storage coating are on average less than 35%, alternatively less than 20%, alternatively less than 10%, alternatively less than 5%. In some embodiments, the average atomic % of silicide-forming metallic elements within the lithium storage coating are in a range of about 0.01% to about 10%, alternatively about 0.05 to about 5%. In some embodiments, the atomic % of silicide forming metallic elements in the lithium storage coating is higher nearer the current collector than away from the current collector.

Other Anode Features

In some embodiments, the anode may further include one or more supplemental layers. provided over the outer surface of the lithium storage coating. In some embodiments, the supplemental layer is a protection layer to enhance lifetime or physical durability. The supplemental layer may be an oxide or nitride formed from the lithium storage material itself, e.g., silicon dioxide, silicon nitride, or silicon oxynitride in the case of silicon. A supplemental layer may be deposited, for example, by ALD, CVD, PECVD, evaporation, sputtering, solution coating, ink jet or any method that is compatible with the anode. In some embodiments, a supplemental layer is deposited in the same CVD or PECVD device as the lithium storage coating. For example, stoichiometric silicon dioxide or silicon nitride supplemental layer by be formed by introducing an oxygen- or nitrogen-containing gas (or both) along with the silicon precursor gas used to form the lithium storage coating. In some embodiments the supplemental layer may include boron nitride or silicon carbide. In some embodiments, a supplemental layer may include a metal compound as described below.

In some embodiments, the one or more supplemental layers may help stabilize the lithium storage coating by providing a barrier to direct electrochemical reactions with solvents or electrolytes that can degrade the interface. A supplemental layer should be reasonably conductive to lithium ions and permit lithium ions to move into and out of the lithium storage coating during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10^{-6}$ S/cm. In some embodiments, the supplemental layer acts as a solid-state electrolyte. In some embodiments, the supplemental layer(s) are less electrically conductive than the lithium storage structure so that little or no electrochemical reduction of lithium ions to lithium metal occurs at the supplemental layer/electrolyte interface. In addition to providing protection from electrochemical reactions, a multiple supplemental layer structure embodiments may provide superior structural support. In some embodiments, although the supplemental layers may flex and may form fissures when the lithium storage coating expands during lithiation, crack propagation can be distributed between the layers to reduce direct exposure of the lithium storage structure to the bulk electrolyte. For example, a fissure in the second supplemental layer may not align with a fissure in the first supplemental layer. Such an advantage may not occur if just one thick supplemental layer is used. In an embodiment, the second supplemental layer may be formed of a material having higher flexibility than the first supplemental layer.

In some embodiments, a supplemental layer may include silicon nitride, e.g., substantially stoichiometric silicon nitride where the ratio of nitrogen to silicon is in a range of 1.33 to 1.25. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. Silicon nitride may be deposited by an atomic layer deposition (ALD) process or by a CVD process. In some embodiments, the lithium storage coating includes silicon deposited by some type of CVD process as described above, and at the end, a nitrogen gas source is added to the CVD deposition chamber along with the silicon source.

In some embodiments, a supplemental layer may include silicon dioxide, e.g., substantially stoichiometric silicon dioxide where the ratio of oxygen to silicon is in a range of 2.0 to 1.9. A supplemental layer comprising silicon dioxide may have an average thickness in a range of about 2 nm to 10 nm, alternatively 10 nm to 30 nm, alternatively 30 nm to 50 nm, alternatively 50 nm to 70 nm, alternatively 70 nm to 100 nm, alternatively 100 nm to 150 nm, alternatively 150 nm to 200 nm, or any combination of contiguous ranges thereof. Silicon dioxide may be deposited by an atomic layer deposition (ALD) process or by a CVD process. In some embodiments, the lithium storage coating includes silicon deposited by some type of CVD process as described above, and at the end, an oxygen-containing gas source is added to the CVD deposition chamber along with the silicon source.

In some embodiments, a supplemental layer may include silicon oxynitride, e.g., a substantially stoichiometric oxynitride of silicon ($SiO_xN_y$) wherein the sum of 0.5x and 0.75y is in a range of 1.00 to 0.95. A supplemental layer comprising silicon nitride may have an average thickness in a range of about 0.5 nm to 1 nm, alternatively 1 nm to 2 nm, alternatively 2 nm to 10 nm, alternatively 10 nm to 20 nm, alternatively 20 nm to 30 nm, alternatively 30 nm to 40 nm, alternatively 40 nm to 50 nm, alternatively 50 nm to 70 nm, alternatively 70 nm to 100 nm, alternatively 100 nm to 150 nm, or any combination of contiguous ranges thereof. In some embodiments, silicon oxynitride may be provided by a CVD process, including but not limited to, a PECVD process. The oxygen and nitrogen may be provided uniformly within the lithium storage coating, or alternatively the oxygen or nitrogen content may be varied as a function of position (e.g., height) within the storage layer.

In some embodiments, silicon nitride, silicon dioxide, or silicon oxynitride may be deposited by an atomic layer deposition (ALD) process or by a CVD process. In some embodiments, the lithium storage coating includes silicon deposited by some type of CVD process as described above, and at the end, a nitrogen- and/or an oxygen-containing gas source is added to the CVD deposition chamber along with the silicon source.

In some embodiments a supplemental layer may include a metal compound. In some embodiments, the metal compound includes a metal oxide, metal nitride, or metal oxynitride, e.g., those containing aluminum, titanium, vanadium, zirconium, or tin, or mixtures thereof. In some embodiments, a supplemental layer including a metal oxide, metal nitride, or metal oxynitride, may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof. The metal oxide, metal nitride, or metal oxynitride may include other components or dopants such as transition metals, phosphorous or silicon.

In some embodiments, the metal compound may include a lithium-containing material such as lithium phosphorous oxynitride (LIPON), a lithium phosphate, a lithium aluminum oxide, or a lithium lanthanum titanate. In some embodiments, the thickness of supplemental layer including a lithium-containing material may be in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments the metal compound may be deposited by a process comprising ALD, thermal evaporation, sputtering, or e-beam evaporation. ALD is a thin-film deposition technique typically based on the sequential use of a gas phase chemical process. The majority of ALD reactions use at least two chemicals, typically referred to as precursors. These precursors react with the surface of a material one at a time in a sequential, self-limiting, manner. Through the repeated exposure to separate precursors, a thin film is deposited, often in a conformal manner. In addition to conventional ALD systems, so-called spatial ALD (SALD) methods and materials can be used, e.g., as described U.S. Pat. No. 7,413,982, the entire contents of which are incorporated by reference herein for all purposes. In certain embodiments, SALD can be performed under ambient conditions and pressures and have higher throughput than conventional ALD systems.

In some embodiments, the process for depositing the metal compound may include electroless deposition, contact with a solution, contact with a reactive gas, or electrochemical methods. In some embodiments, a metal compound may be formed by depositing a metallic layer (including but not limited to thermal evaporation, CVD, sputtering, e-beam evaporation, electrochemical deposition, or electroless deposition) followed by treatment to convert the metal to the metal compound (including but not limited to, contact with a reactive solution, contact with an oxidizing agent, contact with a reactive gas, or a thermal treatment).

The supplemental layer may include an inorganic-organic hybrid structure having alternating layers of metal oxide and bridging organic materials. These inorganic-organic hybrid structures are sometimes referred to as "metalcone". Such structures can be made using a combination of atomic layer deposition to apply the metal compound and molecular layer deposition (MLD) to apply the organic. The organic bridge is typically a molecule having multiple functional groups. One group can react with a layer comprising a metal compound and the other group is available to react in a subsequent ALD step to bind a new metal. There is a wide range of reactive organic functional groups that can be used including, but not limited to hydroxy, carboxylic acid, amines, acid chlorides and anhydrides. Almost any metal compound suitable for ALD deposition can be used. Some non-limiting examples include ALD compounds for aluminum (e.g., trimethyl aluminum), titanium (e.g., titanium tetrachloride), zinc (e.g., diethyl zinc), and zirconium (tris (dimethylamino)cyclopentadienyl zirconium). For the purposes of the present disclosure, this alternating sublayer structure of metal oxide/bridging organic is considered a single supplemental layer of metalcone. When the metal compound includes aluminum, such structures may be referred to as an alucone. Similarly, when the metal compound includes zirconium, such structures may be referred to as a zircone. Further examples of inorganic-organic hybrid structures that may be suitable as a supplemental layer may be found in U.S. Pat. No. 9,376,455, and US patent publications 2019/0044151 and 2015/0072119, the entire contents of which are incorporated herein by reference.

In some embodiments, a supplemental layer having a metalcone may have a thickness in a range of 0.5 nm to 200 nm, alternatively 1 nm to 10 nm, alternatively 10 nm to 20 nm, alternatively 20 nm to 30 nm, alternatively 30 nm to 40 nm, alternatively 40 nm to 50 nm, alternatively 50 nm to 100 nm, alternatively 100 to 200 nm, or any combination of contiguous ranges thereof.

In some embodiments a supplemental layer (a first, a second, or an additional supplemental layer) may include boron nitride or silicon carbide and may have an average thickness of less than about 100 nm, for example, in a range of about 0.5 nm to about 1 nm, alternatively about 1 nm to about 2 nm, alternatively 2 nm to 10 nm, alternatively 10 nm to 20 nm, alternatively 20 nm to 30 nm, alternatively 30 nm to 40 nm, alternatively 40 nm to 50 nm, or any combination of contiguous ranges thereof.

In some embodiments the anode is at least partially pre-lithiated, i.e., the lithium storage coating and/or a metal oxide coating includes some lithium prior to battery assembly, that is, prior to combining the anode with a cathode in a battery cell. Note that "lithiated storage coating" simply means that at least some of the potential storage capacity of the lithium storage coating is filled, but not necessarily all. In some embodiments, the lithiated storage coating may include lithium in a range of 1% to 10% of the theoretical lithium storage capacity of the lithium storage coating, alternatively 10% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of contiguous ranges thereof. In some embodiments, the metal oxide coating may capture some of the lithium, and one may need to account for such capture to achieve the desired lithium range in the lithiated storage coating.

In some embodiments prelithiation may include depositing lithium metal over the lithium storage coating, e.g., by evaporation, e-beam or sputtering. Alternatively, prelithiation may include contacting the anode with a reductive lithium organic compound, e.g., lithium naphthalene, n-butyllithium or the like. In some embodiments, prelithiation may include incorporating lithium by electrochemical reduction of lithium ion in prelithiation solution.

In some embodiments, prelithiation includes physical contact of the lithium storage coating with a lithiation material. The lithiation material may include a reducing lithium compound, lithium metal or a stabilized lithium metal powder, any of which may optionally be provided as a coating on a lithium transfer substrate. The lithium transfer substrate may include a metal (e.g., as a foil), a polymer, a ceramic, or some combination of such materials, optionally in a multilayer format. In some embodiments, such lithiation material may be provided on at least one side of a current separator that faces the anode, i.e., the current separator also acts as a lithium transfer substrate. Stabilized lithium metal powders ("SLMP") typically have a phosphate, carbonate or other coating over the lithium metal particles, e.g. as described in U.S. Pat. Nos. 8,377,236, 6,911,280, 5,567,474, 5,776,369, and 5,976,403, the entire contents of which are incorporated herein by reference. In some embodiments SLMPs may require physical pressure to break the coating and allow incorporation of the lithium into the lithium storage coating. In some embodiments, other lithiation materials may be applied with pressure and/or heat to promote lithium transfer into the lithium storage coating, optionally through one or more supplemental layers. In some embodiments a pressure applied between an anode and a lithiation material may be at least 200 kPa, alternatively at least 1000 kPa, alternatively at least 5000 kPa. Pressure may be applied, for example, by calendering, pressurized plates, or in the case of a lithiation material coating on a current separator, by assembly into battery having confinement or other pressurizing features.

In some embodiments, prelithiation includes thermally treating the lithium storage coating during lithium incorporation, after lithium incorporation, or both during and after. The thermal treatment may assist in the incorporation of the lithium into the lithium storage coating, for example by promoting lithium diffusion. In some embodiments, thermally treating includes exposing the anode to a temperature in a range of 50° C. to 100° C., alternatively 100° C. to 150° C., alternatively 150° C. to 200° C., alternatively 200° C. to 250° C., alternatively 250° C. to 300° C., or alternatively 300° C. to 350° C. In some embodiments, thermal treatment may be done under controlled atmosphere, e.g., under vacuum or argon atmosphere to avoid unwanted reactions with oxygen, nitrogen, water or other reactive gases.

In some embodiments, prelithiation may soften the lithium storage coating, for example, due to the formation of a lithium-silicon alloy. This softening may cause problems in some processes, for example, roll-to-roll processes whereby the softened lithium storage coating begins to stick to rollers or to itself during winding. In some embodiments providing at one or more supplemental layers prior to prelithiation or after prelithiation, the structural integrity and processability of the anode may be substantially improved. In some embodiments, the supplemental layer(s) may act as a harder interface with other surfaces to prevent or reduce contact of such surfaces with the softened lithium storage material.

In some embodiments, lithium metal may be deposited over the lithium storage coating followed by deposition of lithium ion-conducting layer. The anode may be thermally treated prior to deposition of the lithium ion-conducting layer, after deposition of the lithium ion-conducting layer, or both. In some embodiments, the lithium metal is deposited directly onto the lithium storage coating. In some embodiments, a supplemental layer, e.g., silicon nitride, is deposited onto the lithium storage coating prior to deposition of the lithium metal. In some embodiments, the lithium ion-conducting layer may include a lithium-containing material, a metal oxide, or a metalcone. Some non-limiting examples of lithium ion-conducting layer materials include a lithium phosphorous oxynitride (LIPON), a lithium phosphate, a lithium aluminum oxide, a lithium lanthanum titanate, and alucones. The lithium ion-conducting layer may include multiple sublayers of different materials, e.g., selected from the above list.

Thermal treatments were discussed above with respect to prelithiation and metal oxide precursors, but in some embodiments the anode may be thermally treated prior to battery assembly (after deposition of the lithium storage coating is complete, but before the anode is combined with a cathode in a battery cell), with or without a prelithiation step. In some embodiments, thermally treating the anode may improve adhesion of the various layers or electrical conductivity, e.g., by inducing migration of metal from the current collector (i.e., the metal oxide coating or the underlying first or second electrically conductive materials) or atoms from the optional supplemental layer into the lithium storage coating. In some embodiments, thermally treating the anode may be done in a controlled environment, e.g., under vacuum, argon, or nitrogen having a low oxygen and water content (e.g., less than 100 ppm or partial pressure of less than 10 Torr, alternatively less than 1 Torr, alternatively less than 0.1 Torr to prevent degradation). Herein, "under vacuum" generally refers to a reduced pressure condition wherein the total pressure of all gasses (e.g. in a vacuum oven) is less than 10 Torr. Due to equipment limitations, the vacuum pressure is typically greater than about $10^{-8}$ Torr. In some embodiments, anode thermal treatment may be carried out using an oven, a tube furnace, infrared heating elements, contact with a hot surface (e.g. a hot plate), or exposure to a flash lamp. The anode thermal treatment temperature and time depend on the materials of the anode. In some embodiments, anode thermal treatment includes heating the anode to a temperature of at least 50° C., optionally in a range of 50° C. to 600° C., alternatively 100° C. to 250° C., alternatively 250° C. to 350° C., alternatively 350° C. to 450° C., alternatively 450° C. to 600° C., alternatively 600° C. to 700° C., alternatively 700° C. to 800° C., or any combination of contiguous ranges thereof. In some embodiments, the anode thermal treatment time may be in a range of about 0.1 min to about 1 min, alternatively about 1 min to about 5 mins, alternatively about 5 mins to about 10 mins, alternatively about 10 mins to about 30 minutes, alternatively about 30 mins to about 60 mins, alternatively about 60 mins to about 90 mins, alternatively in a range of about 90 mins to about 120 mins, or any combination of contiguous ranges thereof.

In some embodiments one or more of the above processing steps may be performed using roll-to-roll coating methods wherein the electrically conductive substrate is in the form of a rolled film.

Battery Features

The preceding description relates primarily to the anode (negative electrode) of a lithium-ion battery (LIB). The LIB typically includes a cathode (positive electrode), an electrolyte and a separator (if not using a solid-state electrolyte). As is well known, batteries can be formed into multilayer stacks of anodes and cathodes with an intervening separator. Alternatively, a single anode/cathode stack can be formed into a so-called jellyroll. Such structures are provided into an appropriate housing having desired electrical contacts.

In some embodiments, the battery may be constructed with confinement features to limit expansion of the battery, e.g., as described in US published applications 2018/0145367 and 2018/0166735, the entire contents of which are incorporated herein by reference for all purposes. In some embodiments a physical pressure is applied between the anode and cathode, e.g., using a tensioned spring or clip, a compressible film or the like. Confinement, pressure, or both confinement and pressure may help ensure that the anode remains in active contact with the current collector during formation and cycling, which may cause expansion and contraction of the lithium storage coating. In some embodiments, a jelly-roll battery design using metallic or other hard cylindrical housings may provide effective confinement, pressure, or both confinement and pressure.

Figure 8:
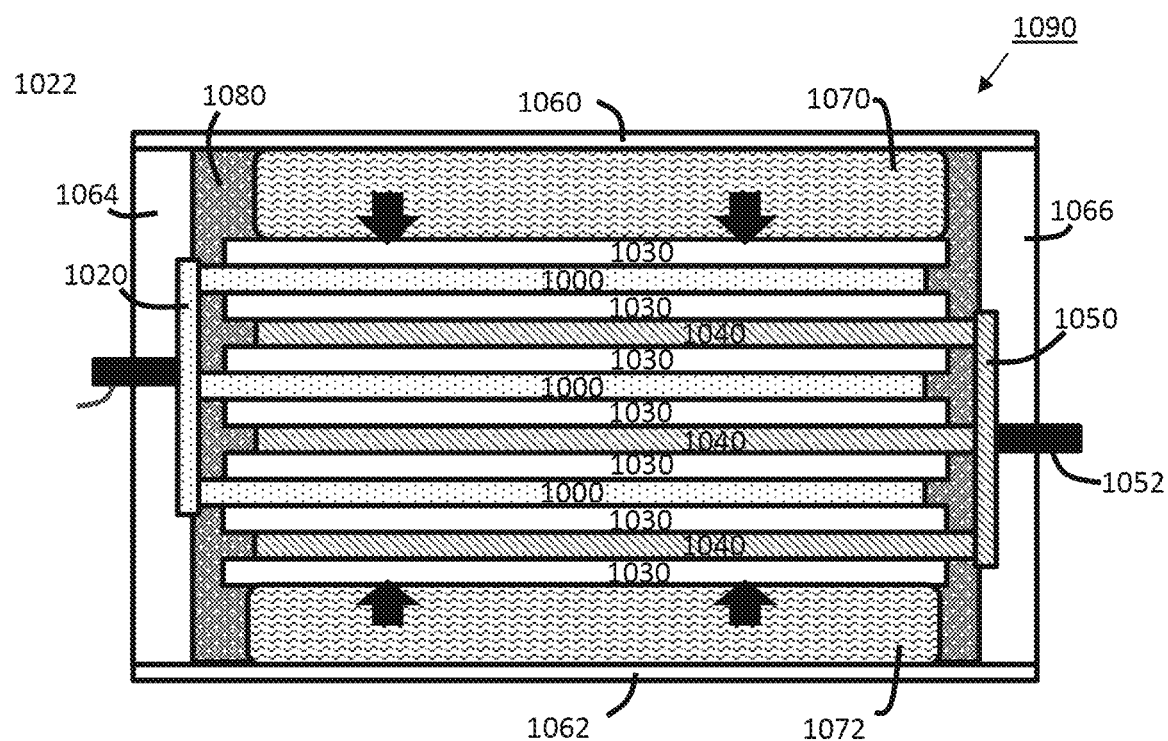
FIG. 8 is a schematic cross-sectional view of a battery according to some embodiments of the present disclosure.

FIG. 8 is a schematic cross-sectional view of a battery according to some embodiments of the present disclosure. Battery 1090 includes top plate 1060, bottom plate 1062, anode side plate 1064, and cathode side plate 1066, which form part of a housing for the stack of anodes 1000, cathodes 1040, and intervening separators 1030. Anodes 1000 may include any anode described herein. Anodes are attached to an anode bus 1020 which is connected to anode lead 1022 that extends through anode side plate 1064. Cathodes are attached to a cathode bus 1050 which is connected to cathode lead 1052 that extends through cathode side plate 1066. Battery 1090 further includes electrolyte 1080 which fills the space and saturates the separators 1030. Top compression member 1070 and lower compression member 1072 apply physical pressure (arrows) between the anodes and cathodes. Compression members may be compressible films, e.g., made from a porous polymer or silicone. Alternatively, compression members may include an array of compressible features, e.g., made from porous polymer or silicone. Alternatively, the compression members may include springs or an array of springs. Alternatively, compression members may correspond to two sides of a compression clip or clamp. In some embodiments, the separator may act as a compressible film. In some embodiments the top and bottom plates may be formed a material and/or structured to resist deformation thereby confining battery swell.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium, sulfur-selenium and combinations thereof. Cathode active materials are typically provided on, or in electrical communication with, an electrically conductive cathode current collector.

In some embodiments, a prelithiated anode of the present disclosure is used with cathode including sulfur, selenium, or both sulfur and selenium (collectively referred to herein as "chalcogen cathodes"). In some embodiments, a prelithiated anode of the present disclosure may be paired with a chalcogen cathode having an active material layer, wherein the active material layer may include a carbon material and a compound selected selected from the group consisting of Se, $Se_yS_x$, $Te_yS_x$, $Te_zSe_yS_x$, and combinations thereof, where x, y and z are any value between 0 and 1, the sum of y and x being 1, and the sum of z, y and x being 1, the compound impregnated in the carbon material, e.g., as described in US published application 2019/0097275, which is incorporated by reference herein for all purposes. The compound may be present in an amount of 9-90% by weight based on the total weight of the active material layer. In some embodiments, the chalcogen cathode active material layer further includes conductive carbon nanotubes to improve overall conductivity and physical durability and may permit faster charging and discharging. The presence of carbon nanotubes may further allow thicker coatings that have greater flexibility thereby allowing higher capacity.

Chalcogen cathodes are generally paired with lithium metal anodes. However, lithium metal anodes are difficult to handle, prone to degradation, and may further allow formation of dangerous dendritic lithium that can lead to catastrophic shorts. In some embodiments, prelithiated anodes of the present disclosure can achieve equivalent energy storage capacity of a pure lithium anode, but are much easier to handle and less prone to form dendritic lithium, thus making them more compatible with chalcogen cathodes.

Current Separator

The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVDF) can also be used. For example, a separator can have >30% porosity, low ionic resistivity, a thickness of ~10 to 50 μm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability. As mentioned, the separator may include a lithiation material such as lithium metal, a reducing lithium compound, or an SLMP material coated at least on the side facing the anode.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3

A salt for liquid electrolytes may include one or more of the following non-limiting examples: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7$)$_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid-state electrolyte may be used without the separator because it serves as the separator itself. It is electrically insulating, ionically conductive, and electrochemically stable. In some embodiments, a solid-state electrolyte may be vapor deposited, solution-coated, melt-coated or a combination thereof. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_6^-$. Safety protection agents include those to protect overcharge, e.g., anisoles, or act as fire retardants, e.g., alkyl phosphates.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode.

Although the present anodes have been discussed with reference to batteries, in some embodiments the present anodes may be used in hybrid capacitor devices. Relative to conventional anodes, the anodes of the present disclosure may have one or more of at least the following unexpected advantages: comparable or improved stability at aggressive ≥1C charging rates; higher overall areal charge capacity; higher gravimetric charge capacity; higher volumetric charge capacity; improved physical durability; simplified manufacturing process; and/or a more reproducible manufacturing process.

Some non-limiting representative embodiments are listed below.

1. An anode for an energy storage device comprising:
   a current collector comprising:
   i) an electrically conductive substrate comprising a first electrically conductive material,
   ii) a plurality of electrically conductive structures in electrical communication with the electrically conductive substrate, wherein each electrically conductive structure of the plurality of electrically conductive structures comprises a second electrically conductive material; and
   iii) a metal oxide coating comprising:
      a) a first metal oxide material in contact with the electrically conductive substrate; or
      b) a second metal oxide material in contact with the plurality of electrically conductive structures; or
      c) both (a) and (b); and
   a lithium storage coating overlaying and in contact with the metal oxide coating, wherein the lithium storage coating comprises a total content of silicon, germanium, or a combination thereof, of at least 40 atomic %; and
   wherein the plurality of electrically conductive structures are at least partially embedded within the lithium storage coating.

2. The anode of embodiment 1, wherein the first electrically conductive material comprises a metal or a conductive carbon.

3. The anode of embodiment 1 or 2, wherein the first electrically conductive material comprises a transition metal.

4. The anode of embodiment 3, wherein the transition metal is copper, nickel, iron, chromium, or titanium.

5. The anode according to any of embodiments 1-4, wherein the first electrically conductive material comprises stainless steel.

6. The anode according to any of embodiments 1-5, wherein the electrically conductive substrate is in the form of a sheet, a foil, or a mesh.

7. The anode of embodiment 1, wherein the electrically conductive substrate comprises a copper foil or mesh, a nickel foil or mesh, a stainless steel foil or mesh, or a conductive carbon sheet or mesh.

8. The anode of embodiment 7, wherein the conductive carbon comprises bundled carbon nanotubes.

9. The anode according to any of embodiments 1-6, further comprising an electrically conductive layer and an insulating support, wherein the electrically conductive substrate comprises the electrically conductive layer provided over the insulating support.

10. The anode according to any of embodiments 1-9, wherein the second electrically conductive material comprises a conductive carbon.

11. The anode according to any of embodiments 1-10, wherein the second electrically conductive material comprises carbon nanotubes.

12. The anode according to any of embodiments 1-11, wherein the second electrically conductive material comprises a metal.

13. The anode according to any of embodiments 1-12, wherein the second electrically conductive material comprises a transition metal.

14. The anode of embodiment 13, wherein the transition metal is copper, nickel, or titanium.

15. The anode of any of embodiments 1-14, wherein the second conductive material comprises a metal silicide.

16. The anode according to any of embodiments 1-15, wherein each electrically conductive structure of the electrically conductive structures is characterized as having a width measured parallel to the electrically conductive substrate surface and a height extending away from, and measured normal to, the electrically conductive substrate surface, the ratio of height to width defining an aspect ratio, wherein the aspect ratio is greater than 1.

17. The anode of embodiment 16, wherein the aspect ratio is at least 3.

18. The anode of embodiment 16 or 17, wherein the height is at least 1 μm.

19. The anode according to any of embodiments 16-18, wherein the height is in a range of about 2 μm to about 20 μm.

20. The anode according to any of embodiments 1-19, wherein at least one of the electrically conductive structures is in the form of a wire, pillar, tube, ridges, or dendrite.

21. The anode according to any of embodiments 1-20, wherein at least one of the electrically conductive structures is a nanowire or a nanotube.

22. The anode according to any of embodiments 1-21, wherein the electrically conductive structures are provided in a non-random pattern over the electrically conductive substrate.

23. The anode according to any of embodiments 1-22, wherein the electrically conductive structures are provided in a random pattern over the electrically conductive substrate.

24. The anode according to any of embodiments 1-23, wherein 2% to 80% of the surface area of the electrically conductive substrate is in contact with the plurality of electrically conductive structures.

25. The anode according to any of embodiments 1-24, wherein the second electrically conductive material is substantially the same as the first electrically conductive material.

26. The anode according to any of embodiments 1-24, wherein the second electrically conductive material is different than the first electrically conductive material.

27. The anode according to any of embodiments 1-26, wherein the current collector does not include the first metal oxide material in contact with the electrically conductive substrate.

28. The anode according to any of embodiments 1-26, wherein the current collector does not include the second metal oxide material in contact with the plurality of electrically conductive structures.

29. The anode according to any of embodiments 1-26, wherein the current collector includes the first metal oxide material and the second metal oxide material.

30. The anode of any of embodiments 27-29, wherein the first metal oxide material and the second metal oxide material comprise substantially the same elemental composition.

31. The anode of any of embodiments 27-29, wherein the first metal oxide material and the second metal oxide material comprise different elemental compositions.

32. The anode according to any of embodiments 1-31, wherein the first metal oxide material comprises a transition metal oxide.

33. The anode according to embodiment 32, wherein the transition metal oxide comprises an oxide of nickel or titanium.

34. The anode according to embodiment 32 or 33, wherein the electrically conductive substrate comprises a metal, and the first metal oxide comprises an oxide of the metal.

35. The anode according to any of embodiments 1-26 or 28-34, wherein the first metal oxide coating has an average thickness of at least 0.005 μm.

36. The anode of embodiment 35, wherein the first metal oxide material has an average thickness in a range of 0.02 to 2.0 μm.

37. The anode according to any of embodiments 1-27 or 29-31, wherein the second metal oxide material comprises a transition metal oxide.

38. The anode according to embodiment 37, wherein the transition metal oxide comprises an oxide of nickel or titanium.

39. The anode according to embodiment 37 or 38, wherein the electrically conductive substrate comprises a metal, and the second metal oxide comprises an oxide of the metal.

40. The anode according to any of embodiments 1-27 or 29-39, wherein the second metal oxide material has an average thickness of at least 0.002 μm.

41. The anode according to any of embodiments 1-26 or 29-40, wherein the second metal oxide material has an average thickness less than the average thickness of the first metal oxide material.

42. The anode of embodiment 40 or 41, wherein the second metal oxide material has a thickness in a range of 0.01 to 1.0 μm.

43. The anode according to any of embodiments 1- 42, wherein the lithium storage coating is porous.

44. The anode according to any of embodiments 1-43, wherein the lithium storage coating comprises at least 85 atomic % amorphous silicon, the lithium storage coating having a density in a range of about 1.1 $g/cm^3$ to 2.2 $g/cm^3$.

45. The anode according to any of embodiments 1-44, wherein the lithium storage coating has a thickness of at least 3 μm.

46. The anode according to any of embodiments 1-45, wherein the lithium storage coating has a thickness in a range of about 7μm to about 30 μm.

47. The anode according to any of embodiments 1-46, further comprising lithium storage nanostructures in contact with the electrically conductive structures.

48. The anode of embodiment 47, wherein the current collector does not include the second metal oxide material.

49. The anode according to any of embodiments 1-46, further comprising lithium storage nanostructures in contact with the electrically conductive substrate.

50. The anode of embodiment 49, wherein the current collector does not include the first metal oxide material.

51. A method of making an anode for an energy storage device, the method comprising:
providing a current collector precursor comprising an electrically conductive substrate comprising i) a first electrically conductive material and ii) a plurality of electrically conductive structures in electrical communication with the electrically conductive substrate, wherein each electrically conductive structure of the plurality of electrically conductive structures comprises a second electrically conductive material;
forming a current collector by:
  a) forming a first metal oxide material in contact with the electrically conductive substrate; or
  b) forming a second metal oxide material in contact with the plurality of electrically conductive structures; or
  c) both (a) and (b); and
depositing by a CVD process a lithium storage coating over the current collector, the lithium storage coating overlaying the first metal oxide coating, the second metal oxide coating, or both, wherein the plurality of electrically conductive structures are at least partially embedded within the lithium storage coating, and
wherein the lithium storage coating comprises a total content of silicon, germanium, or a combination thereof, of at least 40 atomic %.

52. The method of embodiment 51, wherein forming the first metal oxide material comprises oxidation of a portion of the electrically conductive substrate surface.

53. The method of embodiment 51 or 52, wherein forming the second metal oxide material comprises oxidation of a portion of the plurality of electrically conductive structures.

54. The method of embodiment 51, wherein forming the first metal oxide material comprises deposition by ALD, physical vapor deposition, or a CVD process.

55. The method of embodiment 51 or 52, wherein forming the second metal oxide material comprises deposition by ALD, physical vapor deposition, or a CVD process.

56. The method according to any of embodiments 51-55, wherein the first electrically conductive material comprises a metal or a conductive carbon.

57. The method according to any of embodiments 51-56, wherein the first conductive material comprises a transition metal.

58. The method of embodiment 57, wherein the transition metal is copper, nickel, iron, chromium, or titanium.

59. The method according to any of embodiments 51-58, wherein the first conductive material comprises stainless steel.

60. The method according to any of embodiments 51-59, wherein the electrically conductive substrate is in the form of a sheet, a foil, or a mesh.

61. The method according to any of embodiments 51-60, wherein the second conductive material comprises a conductive carbon.

62. The method according to any of embodiments 51-61, wherein the second conductive material comprises carbon nanotubes.

63. The method according to any of embodiments 51-62, wherein the second conductive material comprises a metal.

64. The method according to any of embodiments 51-63, wherein the second conductive material comprises a transition metal.

65. The method of embodiment 64, wherein the transition metal is copper, nickel, or titanium.

66. The method according to any of embodiments 51-65, wherein the second conductive material comprises a metal silicide.

67. The method of according to any of embodiments 51-66, further comprising patterned depositing the plurality of electrically conductive structures over the surface of the electrically conductive substrate to form the current collector precursor, wherein each electrically conductive structure of the plurality of electrically conductive structures comprises a metal.

68. The method according to any of embodiments 51-68, wherein the first electrically conductive material is substantially the same as the second electrically conductive material.

69. The method according to any of embodiments 51-68, wherein the first electrically conductive material and the second electrically conductive material both comprise copper.

70. The method of embodiment 70, wherein first electrically conductive material is different than the second electrically conductive material.

71. The method of embodiment 67, wherein the patterned depositing comprises electroplating, electroless plating, physical vapor deposition, or a CVD process.

72. The method of embodiment 71, further comprising photolithographic methods as part of the patterned depositing.

73. The method of according to any of embodiments 51-69, further comprising etching patterned portions of the electrically conductive substrate to form the plurality of electrically conductive structures of the current collector precursor, wherein the electrically conductive substrate comprises a metal, and wherein each electrically conductive structure of the plurality of electrically conductive structures comprises the metal.

74. The method according to any of embodiments 51-73, wherein the lithium storage coating comprises at least 85 atomic % amorphous silicon, the lithium storage coating having a density in a range of about 1.1 g/cm$^3$ to 2.2 g/cm$^3$.

75. The method according to any of embodiments 51-74, wherein the lithium storage coating has a thickness of at least 3 µm.

76. The method according to any of embodiments 51-75, wherein the CVD process is a PECVD process.

77. A lithium-ion battery comprising the anode according to any of embodiment 1-50 and a cathode.

78. A lithium-ion battery comprising the anode made according to any of embodiments 51-75 and a cathode.

79. The lithium-ion battery of embodiment 77 or 78, wherein the anode is prelithiated and the cathode comprises sulfur, selenium, or both sulfur and selenium.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. An anode for an energy storage device comprising:
   a current collector comprising:
   i) an electrically conductive substrate comprising a first electrically conductive material;
   ii) a plurality of electrically conductive structures in electrical communication with the electrically conductive substrate, wherein each electrically conductive structure of the plurality of electrically conductive structures comprises a second electrically conductive material; and
   iii) a metal oxide coating comprising:
      a) a first metal oxide material in contact with the electrically conductive substrate; or
      b) a second metal oxide material in contact with the plurality of electrically conductive structures; or
      c) both (a) and (b); and
   a lithium storage coating overlaying and in contact with the metal oxide coating, wherein the lithium storage coating comprises a total content of silicon, germanium, or a combination thereof, of at least 40 atomic %; and
   wherein the plurality of electrically conductive structures are at least partially embedded within the lithium storage coating.

2. The anode of claim 1, wherein the first electrically conductive material comprises copper, nickel, iron, chromium, or titanium.

3. The anode of claim 1, wherein the electrically conductive substrate comprises a copper foil or mesh, a nickel foil or mesh, a stainless steel foil or mesh, or a conductive carbon sheet or mesh.

4. The anode of claim 1, wherein the second electrically conductive material comprises a conductive carbon.

5. The anode of claim 1, wherein the second electrically conductive material comprises copper, nickel, or titanium.

6. The anode of claim 1, wherein each electrically conductive structure of the electrically conductive structures is characterized as having a width measured parallel to the electrically conductive substrate surface and a height extending away from, and measured normal to, the electrically conductive substrate surface, the ratio of height to width defining an aspect ratio, wherein the aspect ratio is greater than 3 and the height is at least 1 µm.

7. The anode of claim 1, wherein at least one of the electrically conductive structures is in the form of a wire, pillar, tube, ridge, or dendrite.

8. The anode of claim 1, wherein the electrically conductive structures are provided in a non-random pattern over the electrically conductive substrate.

9. The anode of claim 1, wherein 2% to 80% of the surface area of the electrically conductive substrate is in contact with the plurality of electrically conductive structures.

10. The anode of claim 1, wherein the current collector does not include one of the first metal oxide material in contact with the electrically conductive substrate or the second metal oxide material in contact with the plurality of electrically conductive structures.

11. The anode of claim 1, wherein the current collector includes both the first metal oxide material in contact with the electrically conductive substrate and the second metal oxide material in contact with the plurality of electrically conductive structures.

12. The anode of claim 1, wherein at least one of the first metal oxide material or the second metal oxide material comprises an oxide of a transition metal.

13. The anode of claim 12, wherein at least one of the first metal oxide material or the second metal oxide material comprises an oxide of nickel or an oxide of titanium.

14. The anode of claim 1, wherein the first metal oxide material in contact with the electrically conductive substrate has an average thickness in a range of 0.02 to 2.0 µm.

15. The anode of claim 1, wherein the second metal oxide material in contact with the electrically conductive substrate has a thickness in a range of 0.01 to 1.0 µm.

16. The anode of claim 1, wherein the lithium storage coating is porous and comprises at least 85 atomic % amorphous silicon, the lithium storage coating having a density in a range of 1.1 $g/cm^3$ to 2.2 $g/cm^3$.

17. The anode of claim 1, wherein the lithium storage coating has a thickness of at least 3 µm.

18. The anode of claim 1, further comprising lithium storage nanostructures in contact with the plurality of electrically conductive structures or the electrically conductive substrate.

19. A lithium-ion battery comprising the anode of claim 1 and a cathode.

20. The lithium-ion battery of claim 19, wherein the anode is prelithiated and the cathode comprises sulfur, selenium, or both sulfur and selenium.

* * * * *